US007718020B2

(12) United States Patent
Lerner et al.

(10) Patent No.: US 7,718,020 B2
(45) Date of Patent: May 18, 2010

(54) METHOD AND APPARATUS FOR MANUFACTURE AND INSPECTION OF SWATCH BEARING SHEETS USING A VACUUM CONVEYOR

(75) Inventors: Stanley I. Lerner, Glencoe, IL (US); Steven B. Winter, Highland Park, IL (US); Gregory O'Brien, Oak Park, IL (US)

(73) Assignee: Color Communications, Inc., Chicago, IL (US)

( * ) Notice: Subject to any disclaimer, the term of this patent is extended or adjusted under 35 U.S.C. 154(b) by 1127 days.

(21) Appl. No.: 11/236,069

(22) Filed: Sep. 27, 2005

(65) Prior Publication Data

US 2007/0056675 A1 Mar. 15, 2007

Related U.S. Application Data

(60) Provisional application No. 60/716,359, filed on Sep. 12, 2005.

(51) Int. Cl.
*B32B 41/00* (2006.01)

(52) U.S. Cl. .......................... 156/64; 156/285; 156/297

(58) Field of Classification Search .................. 156/64, 156/285, 297, 379, 538, 539, 578
See application file for complete search history.

(56) References Cited

U.S. PATENT DOCUMENTS

| | | | | |
|---|---|---|---|---|
| 4,061,521 | A | 12/1977 | Lerner et al. | |
| 6,030,481 | A | 2/2000 | Winter et al. | |
| 6,551,431 | B2 * | 4/2003 | Lee | 156/226 |
| 6,579,364 | B2 * | 6/2003 | VerMehren | 118/58 |
| 2002/0129893 | A1 * | 9/2002 | Winter et al. | 156/283 |
| 2004/0237811 | A1 | 12/2004 | Winter et al. | |

FOREIGN PATENT DOCUMENTS

| | | | |
|---|---|---|---|
| DE | 3734536 | A1 | 4/1988 |

* cited by examiner

*Primary Examiner*—George R Koch, III
(74) *Attorney, Agent, or Firm*—Fitch, Even, Tabin & Flannery

(57) ABSTRACT

An apparatus and method of high speed manufacture of swatch bearing sheets wherein each sheet is directed through various operating stations via sequentially releasing a suction force from an endless vacuum belt conveyor while sequentially pulling the sheet onto another endless vacuum belt conveyor with a suction force to allow for substantially continuous engagement of the sheet with the endless vacuum conveyors during the manufacture and inspection of the sheets.

9 Claims, 14 Drawing Sheets

METHOD AND APPARATUS FOR MANUFACTURE AND INSPECTION OF SWATCH BEARING SHEETS USING A VACUUM CONVEYOR

This application claims priority from provisional application 60/716,359 filed Sep. 12, 2005.

FIELD

The invention relates generally to an apparatus and method of forming sheets with swatches and printing thereon.

BACKGROUND

Currently, commercial processes which apply swatches to a sheet, such as shown in Lerner, et al., U.S. Pat. No. 4,061,521 and US2002/0129893 A1 (Winter), and depending on the type of job, provide a relatively high speed operation (e.g., 4,500 sheets per hour) in which blank sheets are fed continuously through operating stations including an adhesive applying station and one or more swatch applying stations where swatches are applied to the sheet.

In making swatch bearing sheets with high process speeds, blank sheets have been pushed by feed fingers (Lerner) or pulled (Winter) by grabbers through the adhesive applying station and the swatch applying stations on top of travel surfaces, at least some of which include upstanding guide portions on one side of the travel surfaces. In the pushing method, these side sheet guides have been spaced apart a distance corresponding to the width of the sheet to ensure the sheets maintain proper alignment as they were pushed by pushing feed fingers through the adhesive applying station and the swatch applying stations. Multiple side sheet guides were required throughout the swatch applying machinery to maintain the sheets in proper alignment. Side sheet guides had been placed before and after the adhesive applying station and each swatch applying station to keep the sheets aligned as they are pushed between stations. Pushing sheets at their trailing edges by pushing feed fingers, without the sheet guides, risked skewing the sheets sideways. This resulted in misfeeds and/or sheets having misaligned swatches. Similar problems may occur with grabbing and pulling sheets downstream by the leading or down stream edge of the sheet.

The feed fingers that pushed the sheets along the travel surfaces in the pushing method were attached to conveyors in the form of drive chains. Separate drive chain conveyors extended between each of the operating stations so that several sets of feed fingers pushed the sheets during their travel from the infeed to the outfeed of the sheets from the machine. The use of multiple sets of conveyers and multiple sets of feed fingers to push each sheet to and from each operating station required precise coordination of the timing of the positions of each set of feed fingers on each conveyor to push the sheet through the operating stations, particularly where operating speed is maximized. Further, the coordination necessary to push a sheet to an operating station with a first set of feed fingers on a first conveyor and then to have a second set of feed fingers on a second conveyor positioned to push the sheet from the operating station had to be precisely timed because errors in the coordination risked misfeeds or misprinted sheets, requiring the machinery to be stopped to correct the errors and reducing the production efficiency of the machinery.

Pushing feed fingers did not positively grip the sheets. Without positive gripping, the feed fingers extended a relatively high distance above the travel surfaces to ensure that they contact the rearward edge of the sheets as occasionally the sheets would not be lying flat on the travel surfaces, for example a curled rearward edge.

Because of the height that the feed fingers extended above the travel surfaces and the lack of positive gripping of the sheets, the feed fingers were not able to push the sheets through the stations. More specifically, upper and lower rollers cooperate to form nips of the operating stations into which the sheets are fed and from which they are discharged. In the nips, adhesive and swatches are applied to the sheets. The height of the feed fingers did not allow for their passage under and through the nip areas between the closely spaced rollers or anvil work surfaces of the operating stations.

Accordingly, instead of using a single set of pushing feed fingers to push the sheets through each operating station, separate sets of pushing feed fingers to push each of the sheets to each station had to be used. The nip formed by the rollers in each station drew the sheets therethrough and discharged them downstream to the next conveyor at which point another set of pushing feed fingers then pushed the sheets to the next station. The timing of the multiple sets of feed fingers had to be coordinated so that as a sheet left a station a new set of feed fingers were positioned to push the sheet to the next station. If the timing was not correctly coordinated, misfeeds occurred. Misfeeds were undesirable because the swatch applying machinery had to be stopped for removal of the misfed sheets and the machinery reset for continued operation.

The swatch applying machinery had to accommodate sheets of different sizes. With changes in paper size, especially when sheets were pushed through work stations, side sheet guides and associated travel surfaces had to be readjusted to maintain the different sized sheets in proper alignment as they traveled. Readjusting sheet guides is labor intensive and could consume as much as four hours creating of labor and equipment down time. When pulling the sheets through the work stations with grippers, a change in paper size risked mispositioning the grippers laterally along the leading edge of the sheet being pulled by the grabbing jaws.

Feeding sheets through work stations at high speeds creates the problem of sheet float. When sheets were pushed through equipment at high speeds, the front or leading edge of the sheet tended to lift up, allowing air to flow underneath the sheet. This resulted in a sheet that at least partially floated on air. The faster the swatch applying machinery was run, i.e., the more sheets per hour fed through the machine, the greater the tendency for sheets to float. The problem of sheet float has been particularly acute when lighter sheet stocks were used. The use of lighter sheet stock has tended to increase the likelihood for the sheets to lift up from the travel surfaces because the sheets do not have sufficient weight to maintain themselves in a planar alignment and against the travel surfaces. When sheets float, there has been increased occurrences of misfeeds and misprints. Floating sheets have tended to deviate from their preferred alignment, even with the assistance of the side sheet guides associated with the travel surfaces. The corners of floating sheets tended to catch on various parts of the swatch applying machinery, causing the sheets to become misaligned.

Floating sheets has limited the operating speed of swatch applying machinery. Moreover, the problem of floating sheets has been costly in terms of labor and lost production time. Labor must be expended to remove sheets that result in misfeeds or misprints. Labor must also be expended to reset the swatch applying machinery for continued production. Machinery remains idle while offending sheets are removed and the machinery reset By engaging the sheets at their downstream edge with grabbers and then pulling the sheets through work stations mitigated a float problem, the pulling grabbers may not firmly held the entire sheet in place. Moreover, the pulling grabbers do not necessarily work well with an electronic visual inspection system because the grabbers may not mechanically engage the sheet so that it is precisely square. Further any reject system where sheet(s) are removed from the production line, the rejected sheet(s) generally have to mechanically engage with additional grabbers or pushers to remove the sheet(s). This makes the machine mechanically complex.

Accordingly, a method and apparatus are needed for directing sheets through swatch applying machinery that reduce the setup time required for changing sheet sizes, reduce problems associated with the occurrence of sheet movement from proper registration while being conveyed downstream, reduce the number of mechanical parts required to move the sheets downstream, and which allow for higher operation speeds of the swatch applying machinery and efficient inspection of the sheets during high speed production.

SUMMARY

In accordance with the present invention, an apparatus and method are provided for the high speed manufacture and inspection of swatch bearing sheets. The method and apparatus permit increases in production speeds of at least 30%. For example if a difficult job causes a prior art machine to operate at 3000 sheets/hour, the invention permits the same job to be done at 4,000 sheets/hour.

In one aspect, the manufacturing apparatus includes a plurality of work stations including at least one adhesive applying station which applies adhesive to a sheet and a swatch applying station which positions swatches on the applied adhesive downstream the adhesive applying station. At least two vacuum belt conveyors advance the sheets through the plurality of stations. The vacuum affirmatively pulls the sheets onto a belt which has selected areas which are porous. The porous areas of the belt keep the sheets in registration and positions the sheets so that the adhesive may be applied to the sheets within vary narrow tolerances and the swatches also may be deposited onto the adhesive in narrow tolerances at high speed without the sheets being misaligned and without having side guide rails to the side of the vacuum belt conveyor to keep the sheets laterally in position as they travel downstream through the adhesive and swatch depositing work stations. A sheet feeder upstream of the vacuum belt conveyor sequentially supplies and deposits the sheets onto the vacuum conveyor. The vacuum belt conveyor substantially maintains the sheets in a generally constant orientation as the sheets are transported downstream through the stations without interfering with operations of the adhesive applying station and swatch applying stations.

In one aspect, a first conveyor belt transports the sheet to the first work station with a discrete porous area of the belt holding the sheet in place as it approaches the work station. As the sheet approaches the work station, the vacuum is released from the pores sequentially as the belt moves linearly in the downstream direction. As the vacuum is released from downstream pores, a vacuum being pulled through upstream pores holds the sheets while the sheet proceeds under the work station where an adhesive is applied. At the time the adhesive is applied, the vacuum pulled through selected upstream pores hold the sheet and permits the conveyor to push the sheet through the work station. As this happens, the vacuum pulled through the pores of the first conveyor is sequentially released from the downstream to the upstream direction and a second vacuum conveyor belt engages the sheet from the first vacuum conveyor as it is being held by the vacuum from the first belt and as it emerges from the first work station to transport the sheet downstream to a second work station. The second vacuum belt also has discrete pore areas through which a vacuum is pulled to sequentially engage the sheet from the downstream edge of the sheet to the upstream direction as the sheet proceeds in the downstream direction to another work station with yet another third conveyor engaging the sheet from the second conveyor as the sheet emerges from the second work station and so on depending on the number of work stations. The sheets are always engaged by a vacuum belt even while being transported through the work stations even though the vacuum belt conveyors do not extend under the work station. With the vacuum belt there is no gripping device which has the potential of interfering with the operation of the work stations. The invention completely eliminates gripping or pushing devices extending above the surface of the belt; hence, when using the vacuum belt conveyor, the work stations can operate on the surface of the sheets transported by the belt without a gripping device even having the potential of interfering with the operation of the work stations. Further, with a vacuum belt, jets of air can be readily used as a non-mechanical way of diverting sheets as "rejects" after the sheets have been inspected and vacuum broken.

In an important aspect, vacuum chambers under the endless vacuum belts permit the vacuum to be pulled under selected areas of pores on the belt and permit the breaking of the vacuum when the chamber ends upstream the work station and the belt moves the sheet over the downstream boundary of the vacuum chamber toward the work station.

The use of multiple vacuum belts with each belt transporting the sheets to a work station has several advantages. Long conveyor belts that are prone to non-linear belt wondering are avoided. The work stations often require hard or anvil surfaces under the sheets with the application of the swatches and adhesive. The combination of a hard anvil surface under the belt with the application of adhesive and swatches onto the sheets on the surface of the belt would undesirably wear the belt. Multiple belts which seamlessly transfer the sheets from belt to belt avoid such wear.

In connection with inspection of the swatch bearing sheets after they have emerged from the work stations and pressing station, the belt transports each sheet with swatches thereon to an electronic video inspection device which views each of the swatch bearing sheets on the vacuum conveyor belt after the sheet emerges from the last downstream swatch applying station. The vacuum conveyor belt affirmatively holds the sheet with the swatches applied thereon and the electronic video inspection device determines if the swatches on the sheet are in the proper position and registration relative to each other and relative to any printed indicia on the sheet. The vacuum belt has the ability to hold the sheet being inspected and subjected to monitoring by video or digital camera without interference from mechanical pushers or grabbers. Because the sheets are pulled and held onto a belt by a vacuum, the view of the inspection device of the surface of the swatch bearing sheets being conveyed there through is completely unobstructed.

The method to make the swatch bearing sheets includes sequentially supplying and depositing the sheets from a feeder onto the vacuum conveyor that has the discrete areas of pores through which the vacuum is pulled. The vacuum belt conveyor maintains the sheets in a substantially constant orientation as it transports the sheets downstream to at least one adhesive applying station and at least one swatch applying station downstream the adhesive applying station. The vacuum belts transport the sheets through the stations. The vacuum on the sheet is released as the belt advances beyond the pull of the vacuum through the pores, but the belt holds the upstream end of the sheet with the remaining areas of the pores which still have a vacuum pull which permits the belt to push the sheet through the work stations as the sheet is held at its upstream end. After application of the adhesive with the use of first and second vacuum belt which are upstream and downstream of the adhesive applying station, the sheet advances through the swatch applying work station, one or more swatches are applied to the adhesive which has been applied to the sheets upstream of the swatch applying station. As the sheet emerges from the first swatch applying work station, it is pulled onto a third vacuum belt which also has discrete areas of pores though which a vacuum is pulled. These pores sequentially engage the sheet as the third vacuum belt and sheet move down stream. The third belt engages the sheet with a vacuum just prior to completely releasing the sheet from the grip of the vacuum from the second belt and while the sheet is in the swatch applying work station. This permits the sheets to flow through and under the work stations and through the pressing station without any interference with pushers and/or grabbing jaws and permits the use of various sizes of sheets without adjustment of the width of devices which push or pull sheets in the downstream direction.

DETAILED DESCRIPTION

Figure 1:
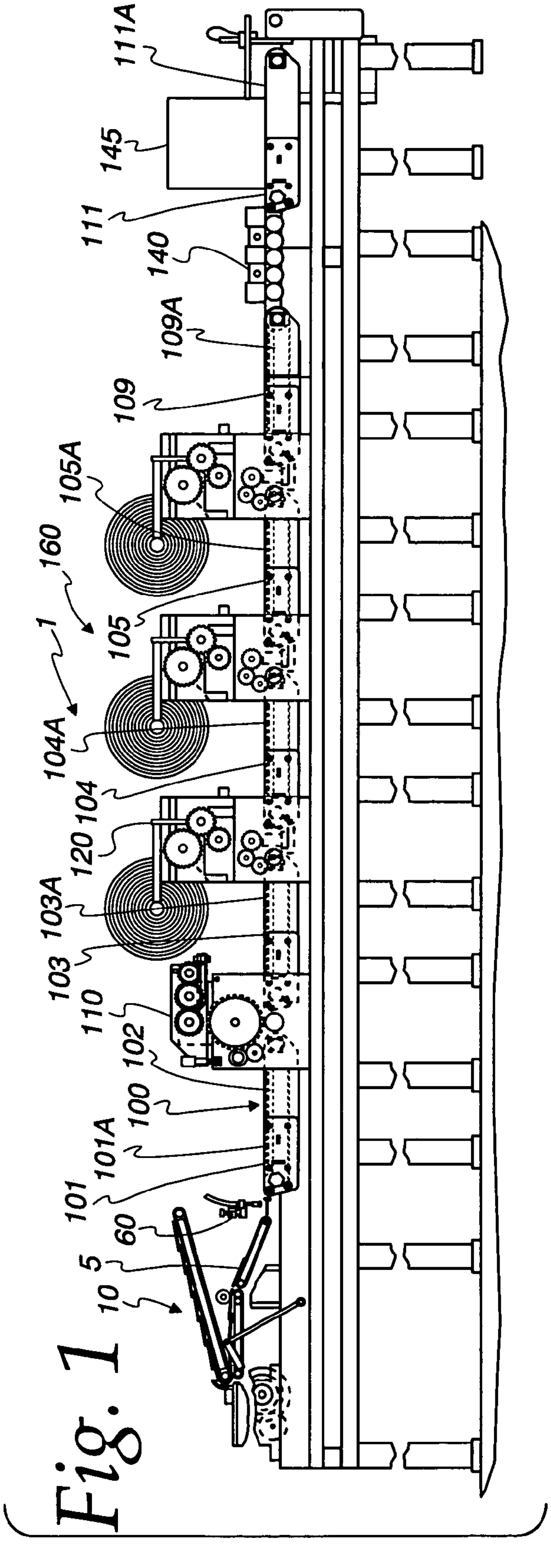
FIG. 1 is an elevation view of an apparatus for adhering swatches in rows on sheets at predetermined locations in accordance with an embodiment of the invention.
Figure 2:
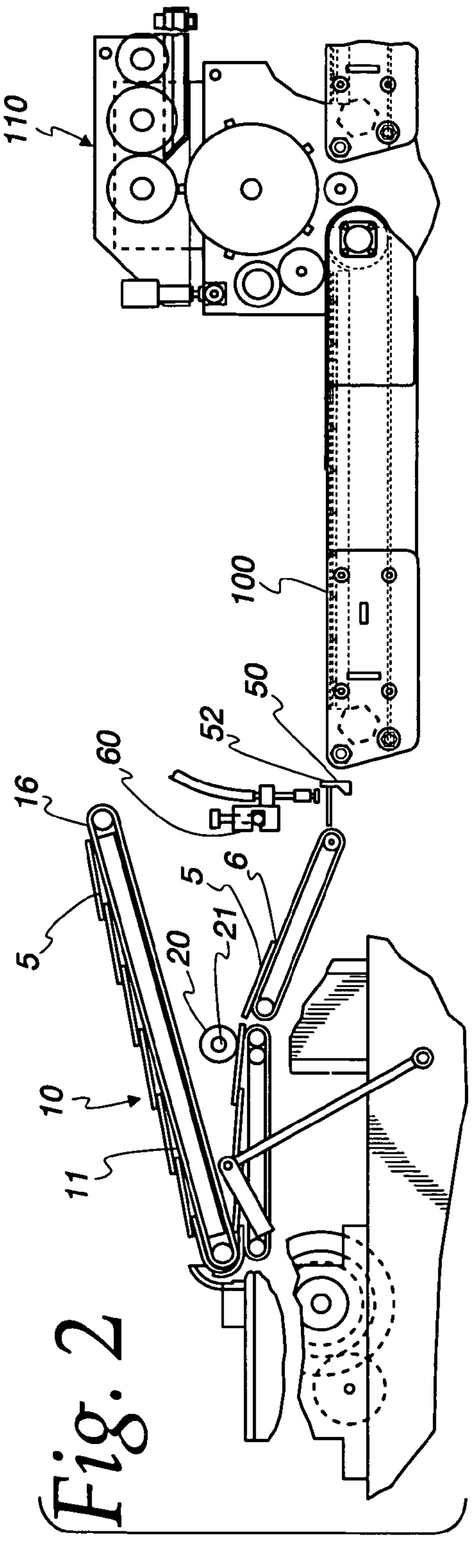
FIG. 2 is a side elevation view of an inclined sheet feed hopper, indexing and feed portions of the feeding station, and an adhesive applying station of the apparatus of FIG. 1.

In FIGS. 1-3 and 9 an apparatus 1 for applying swatches 8 (FIG. 9) to sheets 5 in accordance with the present invention is illustrated. The present apparatus 1 and method performed thereby enable much higher production rates of swatch bearing sheets 5 and minimize the need to perform time consuming set-up operations to tailor the machine for the sheet size being run. The apparatus 1 includes endless vacuum belt conveyors generally designated as 100, forming a conveyor for which the sheets 5 travel through each of the operating stations, generally designated 160. More specifically, the present apparatus 1 and method employ vacuum chambers 102 associated with and under the top surfaces of endless vacuum belt conveyors 100 for sequentially, transporting, releasing, holding and pulling the sheets as the sheets travel downstream through operating stations 160. In one embodiment a first, second, third and fourth endless vacuum belt, 101, 103, 104, 105, 109 and 111, respectively, move the sheets through the adhesive applying station 110, operating stations 160 and pressing station 140. The apparatus 1 and method herein are simpler and more effective than the previously described machines that employ fingers for pushing the sheets or grabbers for pulling the sheets. Since the sheets 5 are traveling between rollers and counter-pressure bars in the stations to have adhesive and swatches applied thereto, as will be more fully described hereinafter, endless vacuum belt conveyors 100 are more desirable because they allow the sheets 5 to pass through the operating stations 160 without requiring shifting of the nip or pressure bars. This feature further improves the production process by reducing overall production errors and general manufacturing complexities associated with the shifting of the nip or pressure bars.

Figure 5:
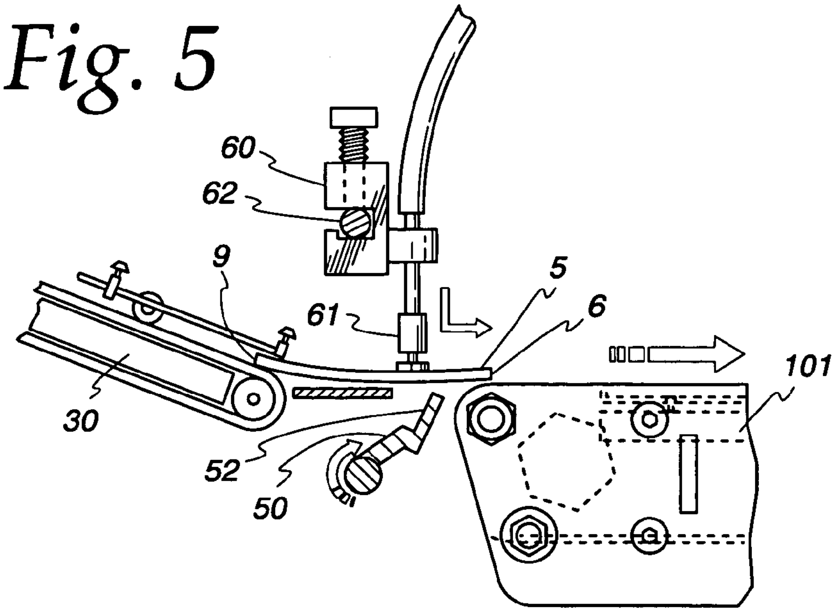
FIG. 5 is an elevation view similar to FIG. 4 showing the sheet drawn to the suction feeder, the suction feeder in its second position with suction applied thereto, and the first vacuum belt.
Figure 6:
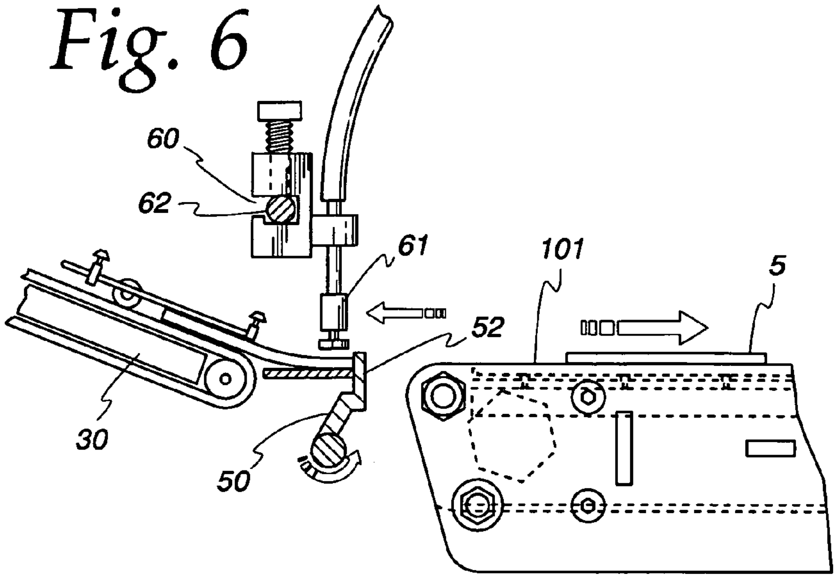
FIG. 6 is a view similar to FIGS. 4 and 5 showing the sheet being transported in a downstream direction by the first vacuum belt, a next sheet feeding down the inclined feed tray, and the suction feeder in its first position without suction applied thereto.

Furthermore, vacuum suction forces acting through discrete porous areas 70 (FIGS. 3A and 10) of the endless vacuum belt conveyors 100 pulls the leading edge 6 of the sheet 5 onto the first vacuum belt 101 (FIG. 5) and then transports the sheets through each of the operating stations 160 thereby providing an even higher degree of control over the sheets 5 as compared to the control afforded by the feed fingers or grabbers, as discussed previously. As seen in FIG. 3A, the discrete areas of pores may be a square array of holes 72 where the center of the holes are at the corner of a 0.2 inch square where the upstream edge of each square is spaced about 1.25 inches (in the longitudinal or machine direction). The square arrays of holes are separated by about 4 inches in the cross direction (which is transverse to the machine direction). The positive holding of the sheets via a vacuum suction force is especially important during high speed operations particularly where light sheet stock is being run, because air flow past the uncontrolled leading edges of the sheets and thereunder can create fluttering effects. Sheet fluttering or floating can cause the sheets to become slightly skewed with respect to the direction of travel and/or crumpling when fed to the operating areas. In either instance, undesirably high levels of sheet spoilage results, and if the sheets are damaged, time consuming and costly machine shut down can be required lowering overall machine productivity rates.

Furthermore, engaging and holding the sheet 5 with a suction force acting through discreet areas of pores 70 in the endless vacuum belt conveyors 100 keeps the sheets 5 in greater alignment during downstream travel even at high operating speeds thereby reducing mechanical complexity by eliminating the need for grippers or grabbers during operation. The suction force pulling and holding the sheet 5 on the top surfaces 101A, 102A, 103A, 104A, 105A, 109A and 111A of the vacuum belts allows the sheet to maintain the same position relative to moving support surfaces of the endless vacuum belt conveyors. Thus, the need for side guides as the sheets proceed through the work stations and the labor-intensive adjustment task required when adjusting the machine to run sheets of differing sizes, as has previously been described with respect to the pullers is substantially eliminated. In addition, with the positively engaged bottom surface of the sheet including leading edge 6 of sheet 5, the sheets will not flutter even when being transported at high speeds downstream by the vacuum conveyors. It has been found that by way of the present apparatus 1 and method, swatch bearing sheets 5 can be produced at much high production rates with significantly lower amounts of spoiled sheets.

In one embodiment of the invention, a plurality of sheets 5 are arranged in a shingle-like fashion in a stack on an inclined sheet feed hopper 11, as illustrated in FIGS. 2-6. Disposed below the inclined sheet feed hopper 11 are indexing 14 (FIG. 4) and feed portions 15 (FIG. 4) of the feeding station 10. The combined use and arrangement of the inclined sheet feed hopper 11 and the indexing 14 and feed portions 15 of the feeding station 10 allow for additional stacks of sheets 5 to be placed on the inclined sheet feed hopper 11 without disrupting the flow of sheets 5 on the indexing 14 and feed portions 15 of the feeding station 10. This allows for continuous feeding of sheets 5. Sheets 5 from the stack of sheets 5 on the inclined sheet feed hopper 11 are moved to the indexing portion 14 of the feeding station 10 by belt 16. As the sheets 5 are moved to the indexing portion 14 of the feeding station 10, individual sheets 5 are separated from the stack of sheets 5 such that each sheet 5 has an exposed leading edge 6.

Figure 3:
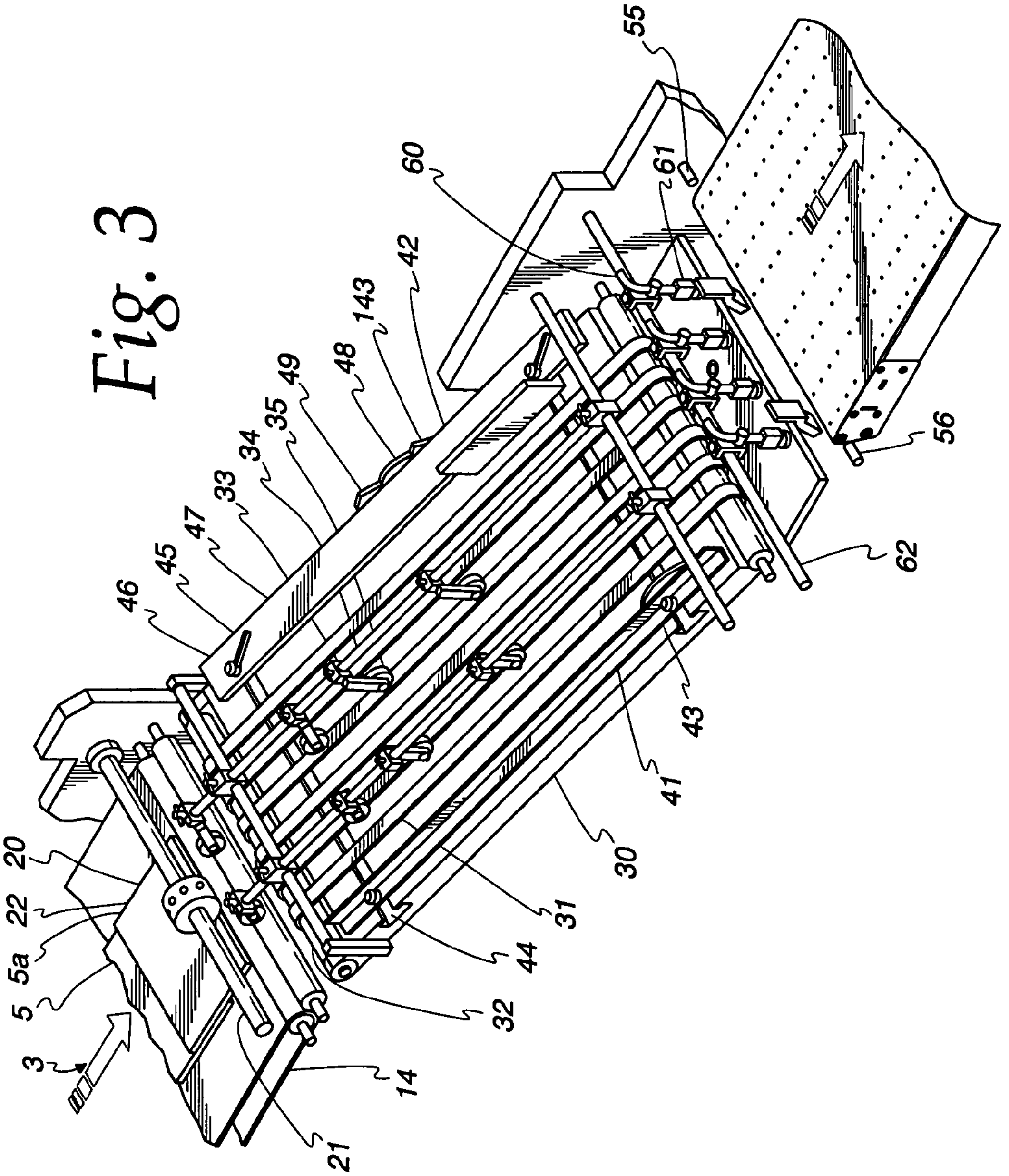
FIG. 3 is a perspective view of the feeding station of the apparatus of FIG. 1.
Figure 3A:
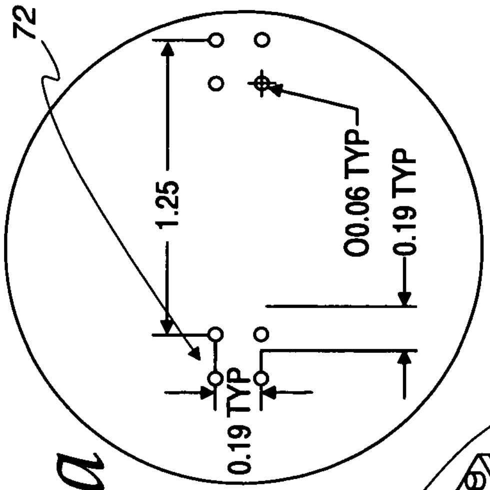
FIG. 3A is an expanded view of the pores in the vacuum belt arrayed in a square pattern.

Single sheets 5 are separated from one another on the indexing portion 14 of the feeding station 10 by a rotating suction wheel 20 (FIG. 3). The rotating suction wheel 20 is mounted to a rotating suction wheel shaft 21. Multiple holes 22 are disposed on the circumference of the rotating suction wheel 20. A suction from a vacuum source (not shown) is applied to these holes 22 in a pulsed manner. As the rotating suction wheel 20 rotates, a suction hole 22 grabs the leading edge 6 of a sheet 5 and removes it from the stack of sheets 5. As the rotating suction wheel 20 continues its rotation, the suction is removed, thereby releasing the sheet 5. One sheet 5 is removed from the stack of sheets 5 with every revolution of the rotating suction wheel 20.

After the sheet 5 has been removed from the stack of sheets 5 by the rotating suction wheel 20, the sheet 5 continues to the feed portion 15 of the feeding station 10. The feed portion 15 of the feeding station 10 comprises an inclined feed plate 30, as illustrated in FIG. 3. Multiple feed belts 31 are entrained about feed belt drive rollers 32 at each end of the feed plate 30. In this manner, each feed belt 31 includes upper and lower runs thereof with the upper run disposed on the top surface of the feed plate 30 and extending the length of the feed plate 30. The sheet 5 rides on the upper run of the feed belts 31 exposed on the top surface of the feed plate 30. The sheet 5 is moved forward on the downward incline of the feed plate 30 of the feed portion 15 of the feeding station 10 by the feed belts 31 from near the rotating suction wheel 20 to a feed end of the feed portion 15 of the feeding station 10 opposite the rotating suction wheel 20.

As the sheets 5 are by the feed belts 31 in the downstream direction of travel and over the feed plate 30 they are kept in contact with the upper runs of the feed belts 31 by multiple pairs of feed plate hold-down mechanisms 33. The hold-down mechanisms 33 reduce slippage between the feed belts 31 and the sheets 5 when they are in contact therewith and ensure the sheets 5 advance in the downstream direction of travel at the same rate as the upper runs of the feed belts 31. The feed plate hold-down mechanisms 33 each have an arm 34 with a feed wheel 35 rotatably attached thereto. The feed wheels 35 rest on the sheet 5 as the sheet 5 is fed along the feed plate 30 by the feed belts 31. The feed wheels 35 are freely rotatable. Near the upstream end of the feed portion 15 of the apparatus 1, the feed wheels 35 have rubber around their circumference to increase friction between the feed wheel 35 and the sheet 5 to maintain the sheet 5 in engagement on the feed belts 31 for downstream travel therewith.

As the sheets 5 are fed in the downstream direction of travel 3 over the feed plate 30 by the feed belts 31, the sheet 5 is moved laterally into the desired positional alignment for feeding of the sheet to a first endless vacuum belt conveyor 101. As the sheets 5 are removed from the stack of sheets 5 by the rotating suction wheel 20, the sheets 5 may be at slightly different lateral positions with respect to their location on the feed plate 30. By sliding each sheet 5 as it moves down the feed plate 30 against a spring member 43 attached to a guide rail 41 disposed on one side of the feed plate, each sheet 5 is thus positioned in the same location for feeding to the first endless vacuum belt conveyor 101 thus ensuring that each sheet 5 has the same lateral alignment, necessary for accurate and consistent placement of the swatches 8 thereon by the apparatus 1.

More specifically, a sheet redirecting or alignment mechanism is provided that shifts the sheets 5 laterally as they travel downstream on the feed belts 31 so that the side edge 5*a* of the sheets 5 spaced from the side guide rail 41 rides close thereto when it reaches the downstream end of the feed plate 30. The sheet alignment mechanism includes a pusher plate 42 that is disposed at the opposite side of the feed plate 30 so that as the pusher plate 42 is shifted laterally it will engage the sheets 5 at their side edges 5*a* opposite side edges thereof. As will be discussed more fuller herein, the shifting of the pusher plate 42 is timed so that it is coordinated with the presence of a sheet 5 that is to be shifted thereby.

The lateral spacing between the guide rail 41 and pusher plate 42 is readily adjustable so that different widths of sheets 5 may be accommodated. To this end, the guide rail 41 is slidable in and can be secured to one or more adjustment slots 44 extending transversely across the feed plate 30. The adjustment of the sheet guide rail 41 is one of the few adjustments necessary to accommodate sheets 5 of differing widths in the apparatus 1, compared to the many adjustments necessitated by the multiple sets of travel surfaces and associated side sheet guides in prior machines discussed previously. This reduces the amount of set-up time for changing between differing widths of sheets 5 from about four hours, as in the previously described machines, to as little as five minutes in the apparatus 1 of the present invention.

The pusher plate 42 has a protrusion (not shown) that fits in the adjustment slot 44 proximate the sheet stop 50. The protrusion on the pusher plate 42 is configured to slide within the adjustment slot 44, thus causing the pusher plate to slide laterally across the feed plate 30 in a direction normal to the downstream travel direction. The pusher plate 42 is biased by a spring mechanism (not shown) away from the guide rail 41.

As each sheet 5 is advanced by the feed belts 31 down the feed plate 30, a cam wheel 48 causes shifting of an actuator, and specifically an actuator plate member 47 thereof via linkages therebetween, a portion 49 of which is shown that is operated by the cam wheel 48, and specifically cam member 143 thereon. The sliding of the plate member 47 is restricted by guide posts 46 that extend through guide slots 45 formed therein. The guide slots 45 extend obliquely with respect to the travel direction. The posts 46 cooperating with the oblique slots 45 cause the plate member 47 to slide in an oblique direction to the downstream travel direction upstream and towards the guide rail 41. The pusher plate 42 abuts against the side of the plate member 47 facing the guide rail 41. The rotation of the cam wheel 48 is coordinated with the indexing and advancement of sheets 5 by the rotating suction wheel 20 and the operating speed of the apparatus 1 by the common drive shaft 151, as illustrated schematically in FIG. 16. Cam member 143 is disposed on the circumferential surface of the cam wheel 48 to project radially outward therefrom. For every rotation of the cam wheel 48, the cam member 143 engages and then disengages the actuator mechanism portion 49. When the cam member 143 of the cam wheel 48 is in engagement with the actuator mechanism portion 49, the actuator mechanism portion 49 pushes the plate member 47 in a direction upstream and towards the guide rail 41. The plate member 47 urges the pusher plate 42 and the sheet 5 against and towards the guide rail 41. The pusher plate 42 is restricted by the cooperating protrusion and the slot 44 to sliding only laterally across the feed plate 30. The guide rail 41 has a spring member 43 thereon facing the pusher plate 42. The spring member 43 absorbs or cushions the slight impact of the sheet 5 as it is pushed thereagainst so that the sheet 5 does not tend to rebound back oppositely to its pushed direction. Without the spring member 43 to prevent the rebounding of the sheet 5, each sheet 5 may not be consistently positioned relative to the guide rail 41 due to the aforesaid impact and rebounding action. As the cam member 43 of the cam wheel 48 disengages from the actuator mechanism portion 49 due to continued rotation of the cam wheel 48, the actuator mechanism portion 49 pulls the plate member 47 back to its original position, allowing the pusher plate 42 to also return to its original position, where the process is repeated again for the next sheet 5 advancing along the surface of the feed plate 30.

At the end of the feed portion 15 of the feeding station 10 opposite the rotating suction wheel 20 is a sheet stop 50. The sheet stop 50 includes a stop bar 51 with two protruding stop members 52 attached thereon. An end of the stop members 52 protrudes above the surface of the feed plate 30. As a sheet 5 is fed by the feed belts 31 to the end of the feed plate 30 opposite the rotating suction wheel 20, the leading edge 6 of the sheet 5 abuts against the stop members 52 of the sheet stop 50. Near the end of the feed plate 30 opposite the rotating suction wheel 20, the feed wheels 35 have multiple bristles around their circumferential edges. The bristles maintain the sheets 5 in contact with the feed belts 31 when the sheets 5 are substantially under the feed wheels 35 with bristles thereon so that the sheet 5 may advance downstream, but the give inherent in the bristles avoids their pushing the trailing edge 9 of the sheet 5 when the sheet 5 is in abutment with the sheet stops 52 so as to cause bending and/or crumpling of the sheet 5 against the sheet stops 52.

At the end of the feed portion 15 of the feeding station 10 opposite the rotating suction wheel 20 and above the feed portion 15 of the feeding station 10 is a suction feeder 60. The suction feeder 60 comprises multiple suction heads 61 mounted on a suction feeder shaft 62. As the sheet 5 is moved by the feed belts 31 and between the guide rail 41 and the pusher plate 42 to the suction feeder 60, a suction applied to the suction heads 61 of the suction feeder 60 draw the leading edge 6 of the sheet 5 upwardly into secure engagement therewith. The suction feeder shaft 62 then pivots the suction heads 61 and the leading edge 6 of the sheet 5 up and away from the top surface of the feed belts 31 on the feed plate 30. As the suction feeder shaft 62 pivots the suction heads 61 and the leading edge 6 of the sheet 5 up and away from the top surface of the feed plate 30, the stop bar 51 pivots the stop members 52 below the top surface of the feed plate 30. The timing of the pivoting of the stop members 52 below the surface of the feed plate 30 and the pivoting of the suction heads 61 toward the forward edge of the feed plate 30 is coordinated by arrangement of respective cams (not shown).

Figure 3B:
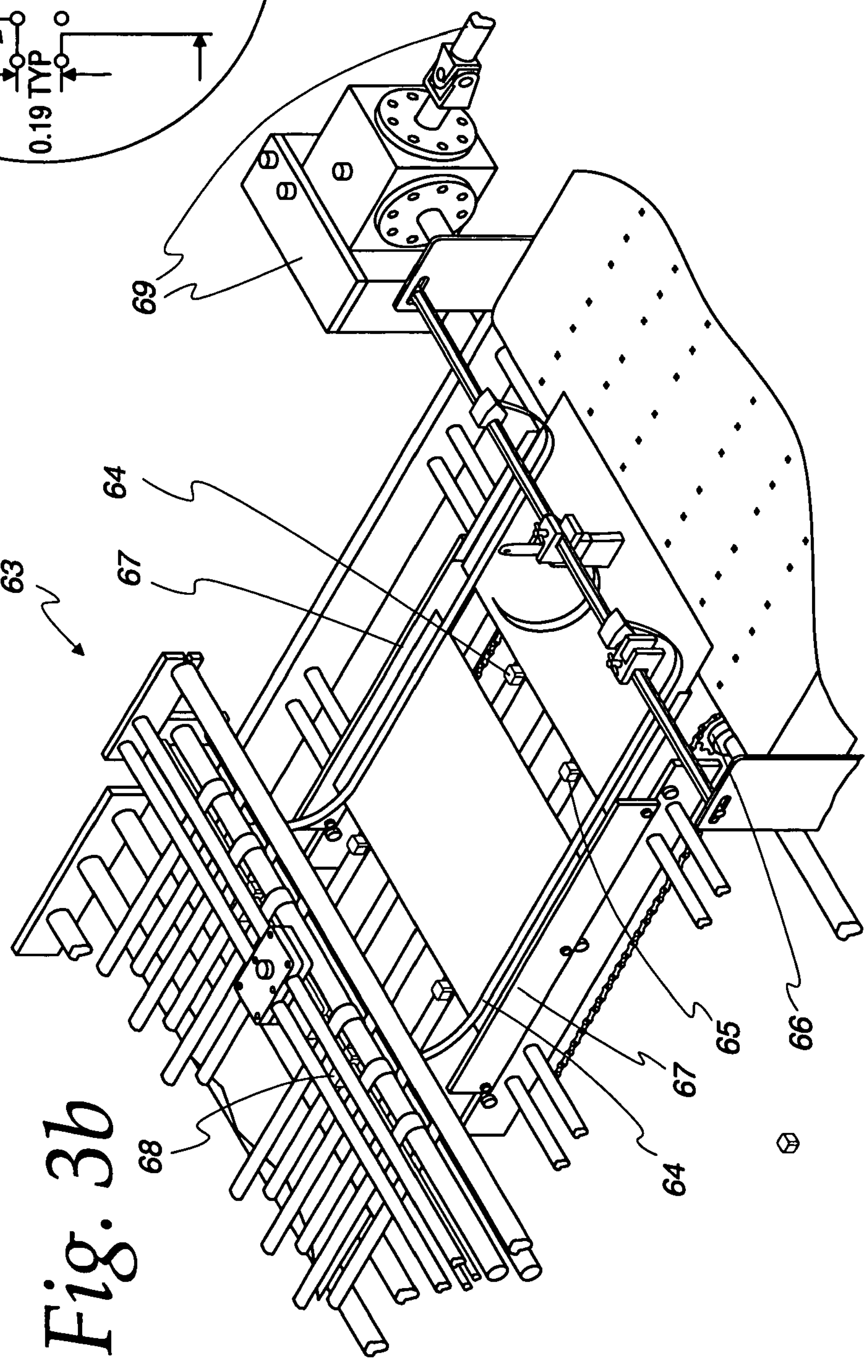
FIG. 3B is a perspective view of an alternate embodiment of a feeding sation in the apparatus of FIG. 1.
Figure 4:
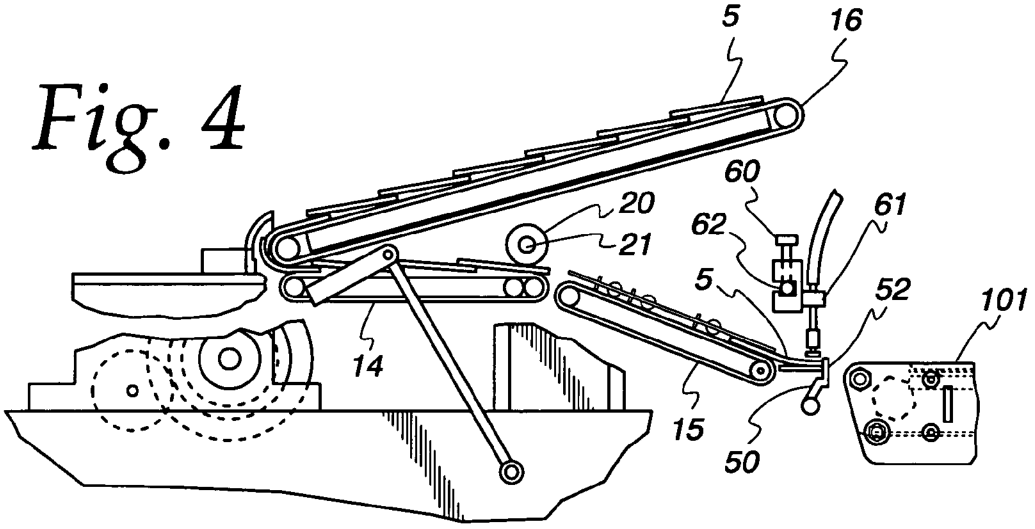
FIG. 4 is an enlarged elevation view of the inclined sheet feed hopper, indexing portion, and feed portion of the feeding station of FIG. 3 showing a sheet abutting against the sheet stop, the suction feeder in its first position without suction applied thereto, and the first vacuum belt.

In an alternate embodiment as seen in FIG. 3B, the feed portion 15 of the feeder station feeds the sheets into a pushing feeding station 63 where dogs or pushers 64 extend up and are perpendicular to the plane of the sheets and push the sheets downstream over holding surfaces 65 which hold the sheets while they are being pushed downstream to the first vacuum belt. The dogs are mounted on endless chains 66 which push the upstream edge of the sheets to push the sheets down a channel created by side guides 67 which extend upwardly and are perpendicular to the support surfaces. An electronic control times the feeder (the control and feed being commercially available from Multifeeder Technology, St. Paul, Minn.) and feeding of the sheets to the pushers. The chains 66 and pushers 64 are mechanically connected to the drive which moves the vacuum belts through gear box 69. A card sensor 68 detects misfeeds of the cards.

The adhesive applying station 110 and at least one swatch applying station 120 are disposed between first and second moving vacuum belts 101 and 103 and the second vacuum belt and third moving vacuum belt 104, and third and fourth moving vacuum belt 105. The first, second, third and fourth moving support surfaces 101A, 103A, 104A and 105A on the upper run portion of the moving vacuum belts provide a flat surface for the sheets 5 to be held on as they are transported in the downstream direction by the first, second, third and fourth endless vacuum belts.

In one form of the invention, an adhesive applying station 110 is located between the first and second endless vacuum belt conveyors 101 and 103 and a swatch applying station 120 is located between the second and third endless vacuum belt conveyors 103 and 104. Multiple swatch applying stations may be added in succession as necessary to meet manufacturing specifications as shown in FIG. 1. Located after the adhesive applying station 110 and the swatch applying station is a pressing station 140, an inspection station 145 downstream the pressing station and a reject station 146 downstream the inspection station.

Figure 7:
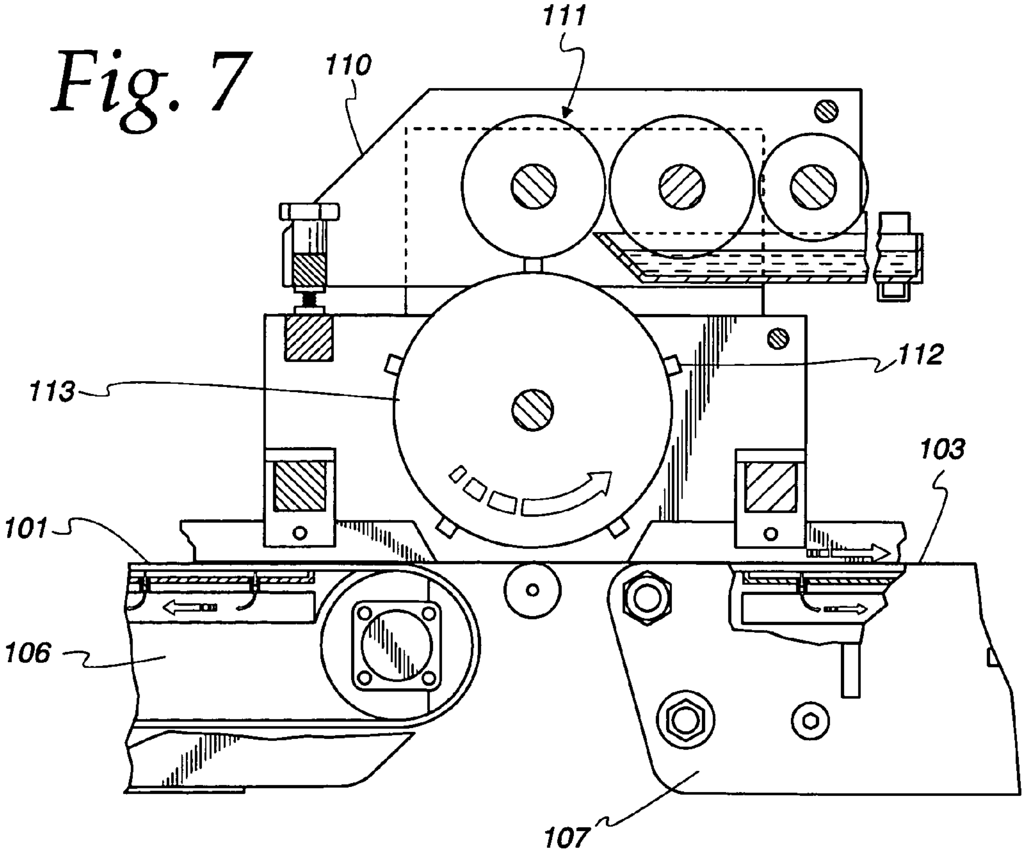
FIG. 7 is an elevation view partially in section of the adhesive applying station of FIG. 1.
Figure 8:
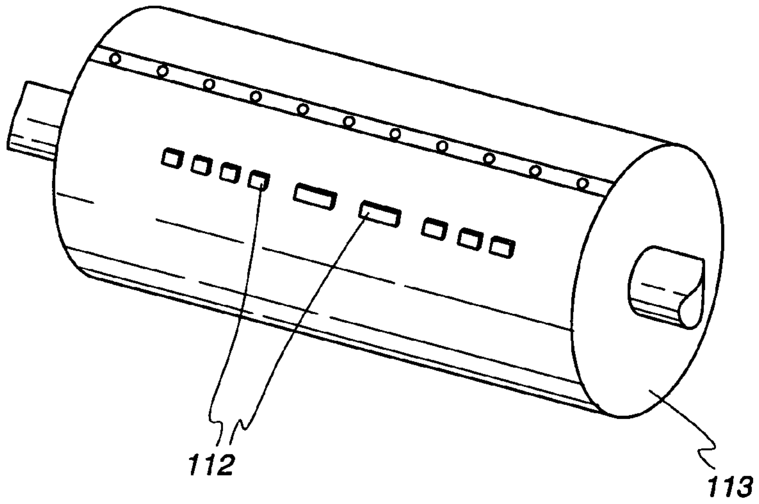
FIG. 8 is a perspective view of the application roller of the adhesive applying station of FIG. 7.
Figure 9:
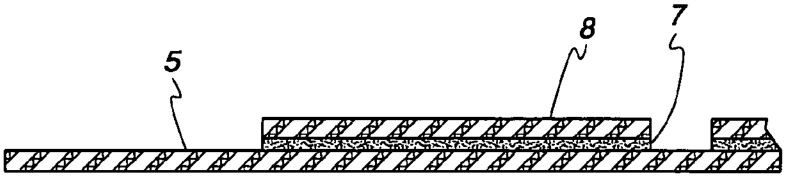
FIG. 9 is a cross-sectional view of a sheet showing an adhesive or glue spot with a swatch attached thereon.

As can been seen in FIGS. 7-9, at the adhesive applying station 110 one or more adhesive or glue spots 7 are applied to the sheet 5. Adhesive or glue in liquid form is deposited on intake rollers 111. The intake rollers 111 are arranged so that their axes of rotation extend parallel to each other and normal to the direction of travel 3 of the endless vacuum belts. As the adhesive or glue is deposited on the intake rollers 111, the intake rollers 111 spread a thin coating of the adhesive or glue on application pads 112 on an application roller 113, as illustrated in FIG. 7. The application pads 112 are typically formed of rubber. The application pads 112 are spaced apart on the application roller 113 so that as the sheet 5 is transported through the adhesive applying station 110 by the vacuum force created by the first and second vacuum chambers 106 and 107, an adhesive or glue spot 7 is applied to each location where a swatch 8 is to be applied. The application roller 113 rotates one revolution for each sheet 5 fed through the adhesive applying station 110.

Figure 10:
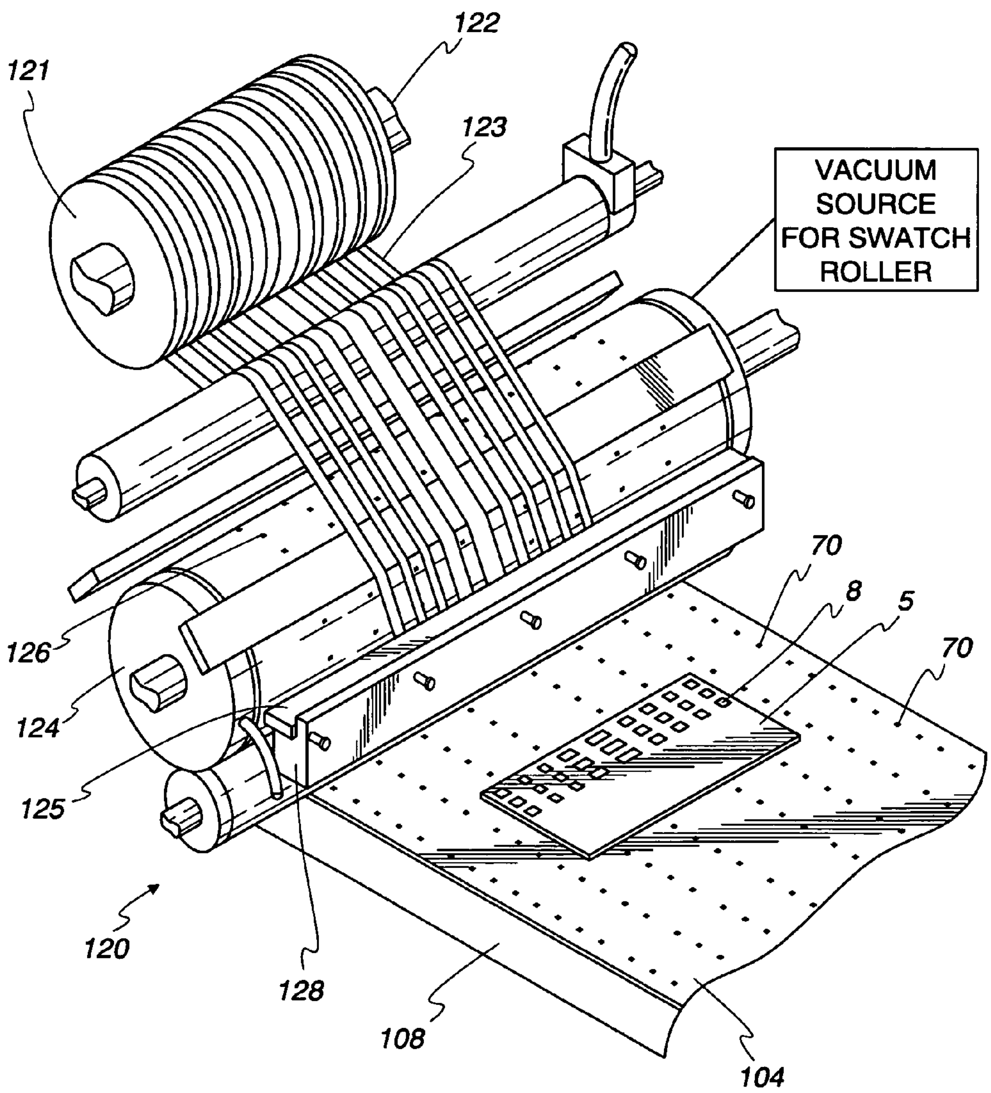
FIG. 10 is a perspective view of a swatch applying station of the apparatus of FIG. 1.
Figure 11:
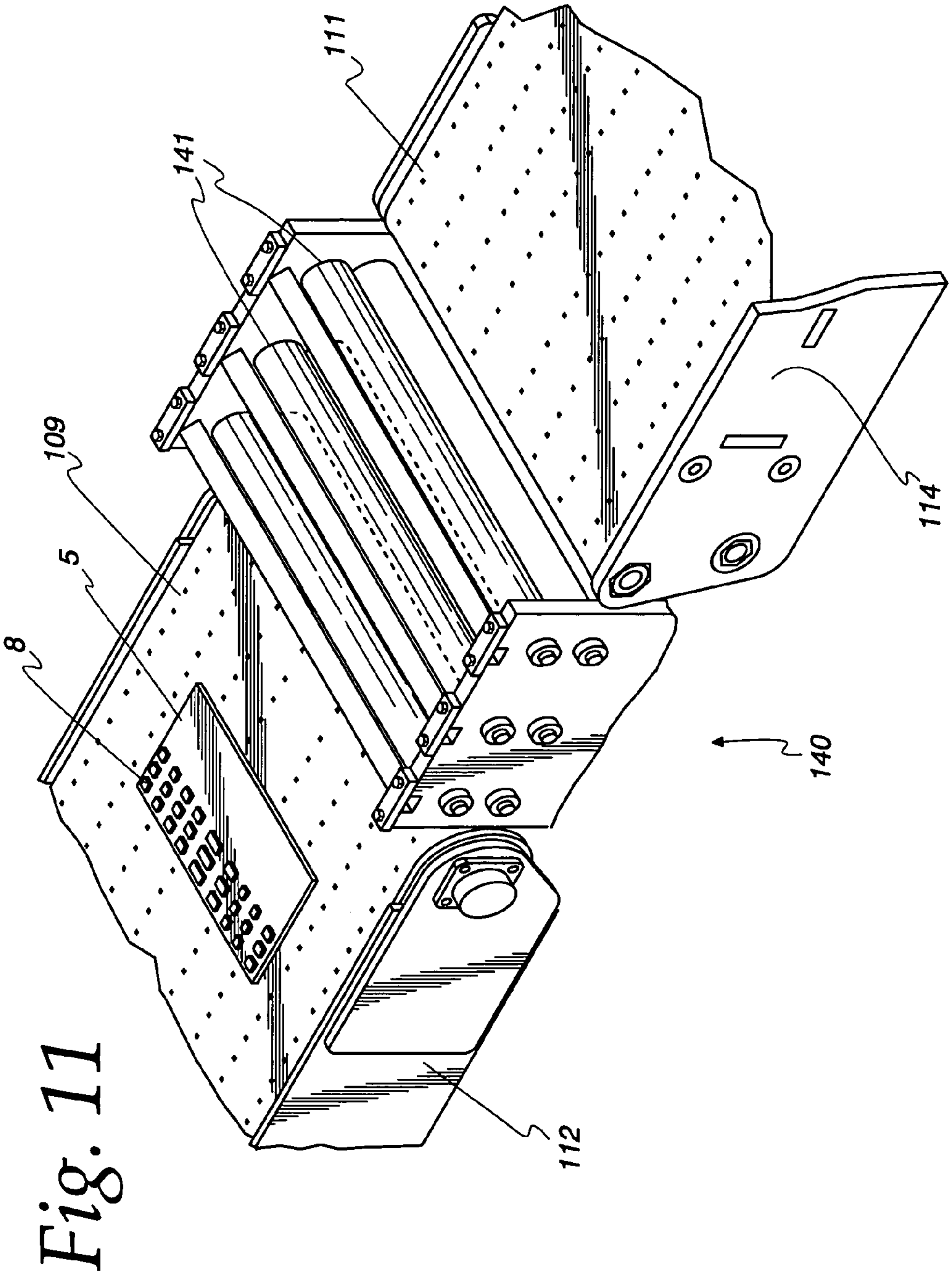
FIG. 11 is a perspective view of the pressing station of the apparatus of FIG. 1.
Figure 12:
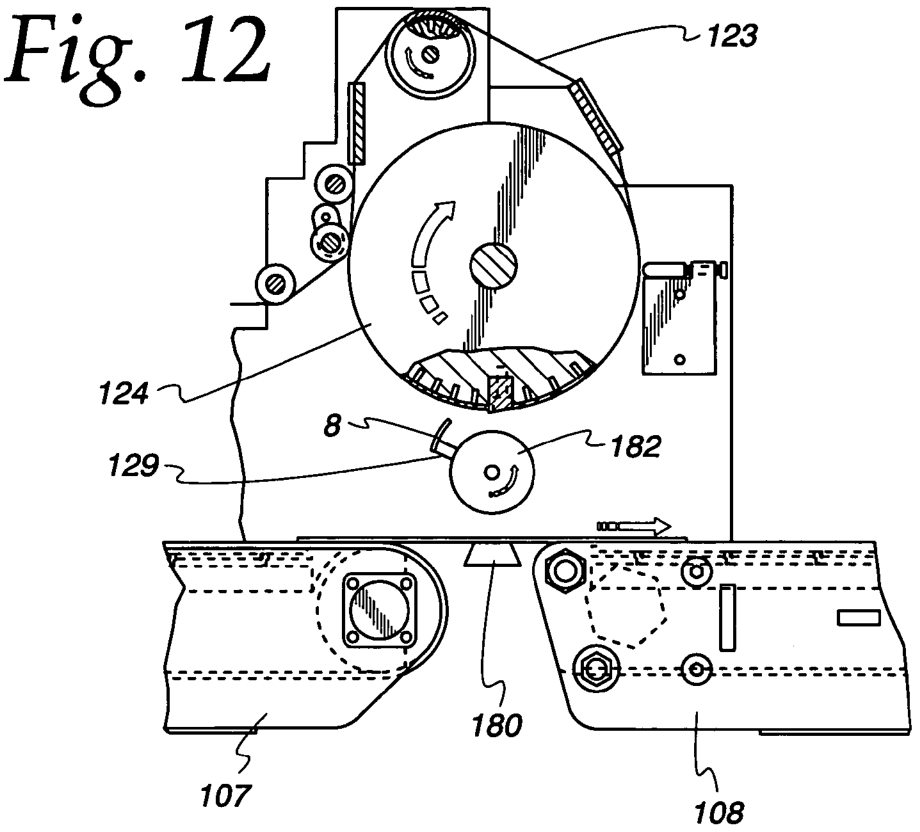
FIG. 12 is an elevational view partially in section of one of the swatch applying stations of FIG. 1 showing a sheet being released from an upstream vacuum belt and engaged by a downstream vacuum belt and being transported through the work station, the rocker bar in its raised position, and a swatch on the suction strip.
Figure 13:
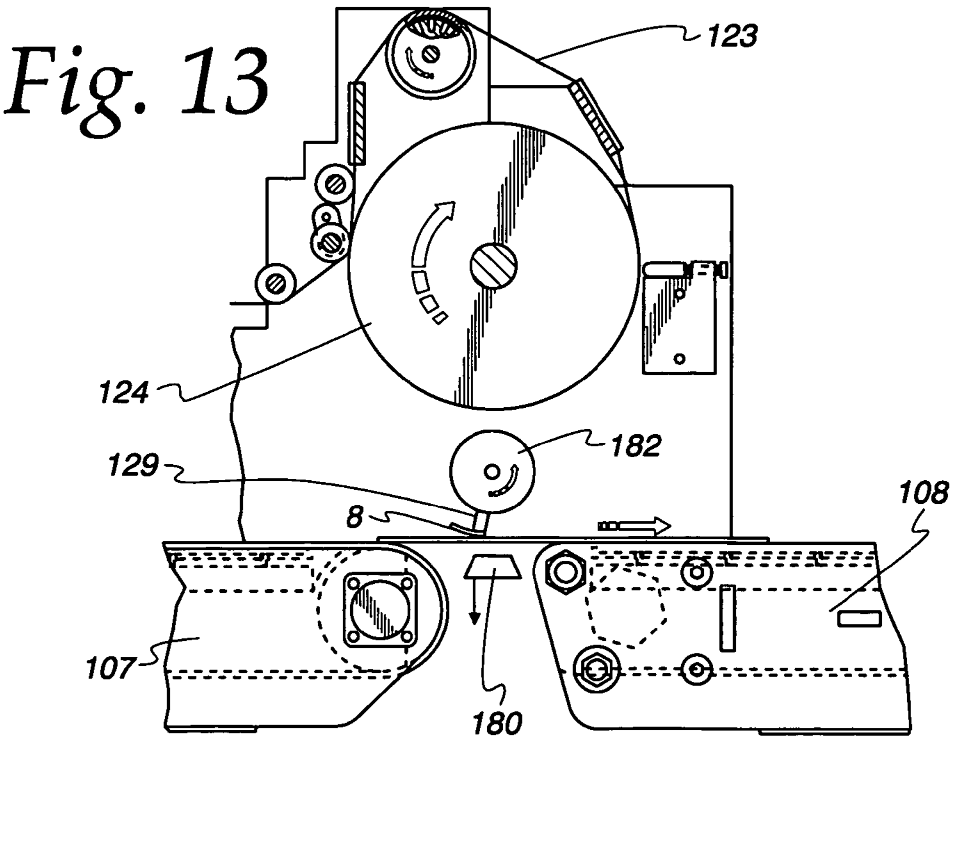
FIG. 13 is an elevational view similar to FIG. 12 showing the rocker bar in its lower position and the swatch beginning to be applied to the sheet.

At each of the swatch applying stations 120 a row of swatches 8 is applied to the sheet 5, as illustrated in FIGS. 10 and 11, respectively. Multiple swatch applying stations 120 may be set up in succession for each column and row of swatches 8 to be deposited on the sheet 5. The row may contain one or more individual swatches 8. It is important that the swatches be precisely placed on the sheets relative to each other and relative to any printed indicia which may be on the sheet. As a result, maintaining the sheet in precisely the same orientation as it proceeds through the machine on the belts is important. Rolls 121 of color ribbons 123 are disposed on a roll bar 122. The rolls 121 may freely rotate about the roll bar 122. Typically, each roll 121 will be of a different color ribbon 123. The swatch roller 124 has a severing blade 125 disposed parallel to the axis of rotation thereof. As the sheet 5 is transported through the swatch applying station 120 by vacuum belts 103 and 104, the swatch roller 124 unwinds each roll 121 of color ribbon 123. As the severing blade 125 of the swatch roller 124 contacts the severing bar 128, an end of each color ribbon 123 is severed into a swatch 8. Suction holes 126 are disposed on the swatch roller 124. Each severed swatch 8 continues to rotate on the swatch roller 124, held in place a suction applied through the suction holes 126, until brought into contact with the suction strip 129 on the transfer roller 182 (FIG. 12). Suction then adheres the swatch 8 the suction strip 129 as the transfer roller 182 rotates the suction strip 129 against the sheet 5 thereunder. A rocker bar 180, or a roller, disposed between a gap in the moving vacuum belts 103 and 104 directly under the axis of the transfer roller 182 rocks downward as the swatch 8 is applied to the adhesive or glue spots 7 on the sheet 5. The swatches 8 then adhere to the adhesive or glue spot 7 on the sheet 5 as the sheet 5 is transported through the swatch applying station 120.

As can be seen in FIGS. 1 and 11, the pressing station 140 is between a fifth moving vacuum belt 109 and a sixth moving vacuum belt 111 and has a series of pressing rollers 141 mounted downstream of the swatch applying station 120. Vacuum chamber 112 and 114 under the vacuum belts pull a vacuum through holes 70 in belts 109 and 111. The pressing rollers 141 move the sheet 5 in the direction of travel through the pressing station 140. The pressing rollers 141 comprise steel cylinders with substantially smooth surfaces formed thereon. An upper pressing roller 141 is provided above a lower pressing roller 141 to form a nip therebetween so that when the sheet 5 is fed thereto, the rotating rollers will draw the sheet through the nip and discharge it therefrom. Multiple sets of upper and lower pressing rollers 141 are preferably provided. The pressing rollers 141 press the swatches 8 to the adhesive or glue spots 7 on the sheet 5 and ensure proper contact therebetween.

As the pressing rollers 141 feed the sheet 5 to the end of the pressing station 140, various other stations may be mounted for receiving the sheets 5 with swatches 8 applied thereon. For example, an inspection station 145 and reject station 146, and/or a folding station (not shown) may be desired to automatically fold the sheets 5. A slicing station (not shown) may be desired to cut the sheets 5 into smaller sheets.

Figure 16:
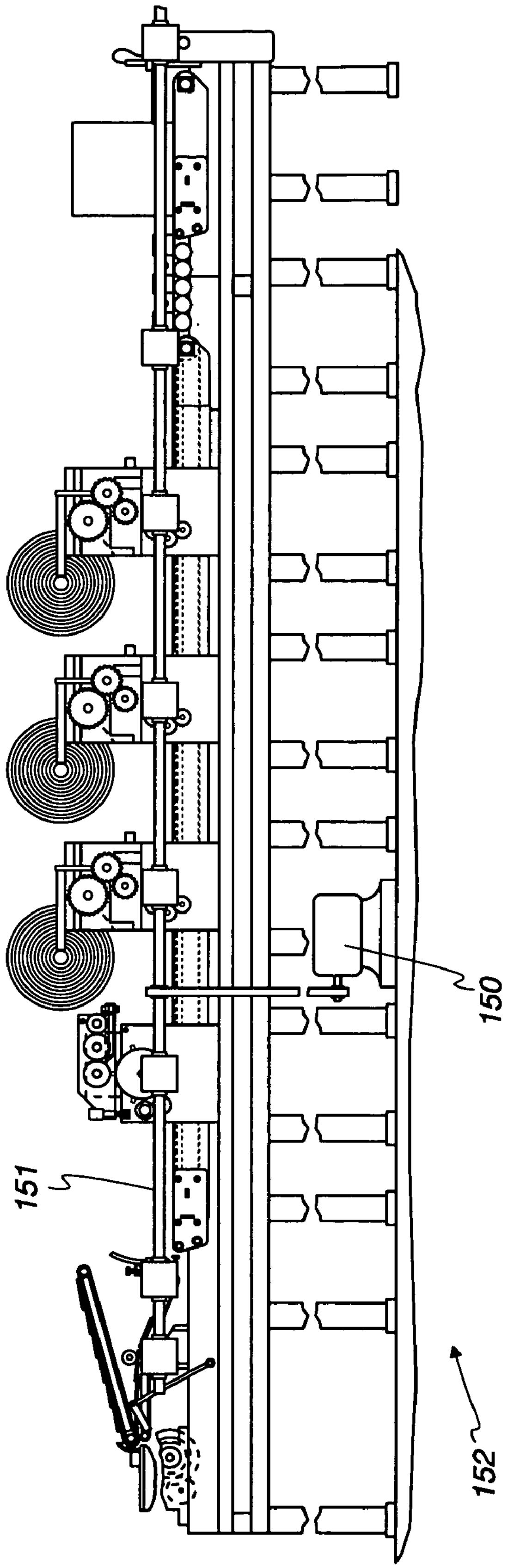
FIG. 16 is an elevational view of the apparatus of FIG. 1 schematically showing the drive shaft and the drive motor.

The speed of the apparatus 1 is controlled by a drive system, generally designated with numeral 152, as schematically illustrated in FIG. 16. A drive motor 150 drives common shaft 151. The drive shaft drives the belts with multiple shafts attached to gear boxes at each work station which gear boxes transfers power into each station. The common shaft 151 is coordinated with the rotating suction wheel shaft 21, the feed belt drive rollers 32, the suction feeder shaft 62, the idler shaft 86, the drive shaft 88, the application roller 113, the transfer roller 182, the hold-down shaft 133, and the pressing rollers 141. Thus, adjustments to the speed of the common drive motor 150 controls the speed of the sheets 5 that are fed to the endless vacuum belt conveyors and thus pulled through the swatch applying machinery 1.

Multiple optical sensors 68 are placed throughout the apparatus 1 to detect the presence of sheets 5. Optical sensors 68 are preferably placed directly on the feeder to detect the presence of sheets 5. If sheets 5 are not detected at the appropriate times by the sensors 68, the feeder is stopped and the operation of the apparatus 1 is paused. The sensor 68 counts the number of sheets 5 fed thereover to maintain an accurate count of sheets 5 run through the apparatus 1. In addition, an optical beam (not shown) is emitted from an emitter 55 (FIG. 3) to detect errors in the feeding of the sheets 5. The optical beam projects from the emitter 55 across the feeder and generally perpendicular to the direction of travel to a reflector 56 disposed on an opposite side of the feeder from the emitter 55. The beam is preferably placed before the adhesive applying station 110 and at a height just above the first and second moving vacuum belts 101 and 103.

The method of operation of the apparatus 1 for applying swatches 8 to sheets 5 is set forth in the Figures and discussed in more detail hereinafter. Sheets 5 begin stacked on an inclined sheet feed hopper 11. Belts 16 advance the stack of sheets 5 to the indexing portion 14 of the feeding station 10. The rotating suction wheel 20 removes individual sheets 5 from the stack of sheets 5 and feeds them to the feed portion 15 of the feeding station 10. Feed belts 31 advance the sheets 5 along the feed portion 15 of the feeding station 10. As the sheets 5 are advanced along the feed portion 15 of the feeding station 10, the pusher plate 42 shifts perpendicular to the downstream direction of travel 3 and towards the guide rail 41, thereby aligning the sheet 5 against the spring member 43 on the guide rail 41. The sheet 5 is fed to the end of the feed portion 15 of the feeding station 10 by the feed belts 31 until the leading edge 6 of the sheet 5 abuts against the stop members 52.

When the leading edge 6 of the sheet 5 abuts against the stop members 52, a vacuum is applied to the suction heads 61 of the suction feeder 60, thereby drawing the leading edge 6 of the sheet 5 up from the surface of the feed plate 30 and against the vacuum heads 61. The vacuum heads 61 then pivot, coincidently pivoting the leading edge 6 of the sheet 5 drawn by the vacuum thereto, in the direction of travel 3 while the stop members 52 simultaneously pivot below the surface of the feed plate 30. As the suction heads 61 pivot to the top of their arc of travel, the leading edge 6 of the sheet 5 is positioned onto the edge of the first moving support surface 101A of the first endless vacuum belt conveyor 101.

As the suction heads 61 are at the top of their arc of travel and the leading edge 6 of the sheet 5 is positioned onto the edge of the first moving vacuum belt 101, a vacuum from a first vacuum chamber 106 associated with the first endless vacuum belt conveyor 101 pulls the sheet onto the first moving support surface with a first vacuum suction force. In the illustrated form of the invention, the first vacuum chamber 106 is secured under the first endless vacuum belt conveyor 101. The first suction force acts through discrete areas of pores 70 located through the first moving support surface 101A to pull the sheets 5 thereon. In the illustrated embodiment, the discrete areas of pores 70 are arranged in rows of eight that are transverse to the downstream direction. Other orientations and/or numbers of discrete areas of pores suitable for a specified production capacity and/or sheet size may be employed.

With the leading edge 6 of the sheet 5 held on the first moving support surface 101A by the first suction force, the suction heads 61 are released and then pivoted back to their original position to a position for drawing a next sheet 5 from the feed plate 30 and placing it onto the first vacuum belt. The leading edge 6 of the sheet 5 then continues moving in the downstream direction on the moving support surface of the first vacuum belt and each successive row of discrete areas of pores on the first moving support surface 101A sequentially pull and hold the remaining portion of the sheet 5 on the first endless vacuum conveyor belt 101 as the belt moves downstream over the first vacuum chamber 106. This sequential engagement of the sheet 5 provides a substantially complete engaging force that holds the position of the sheet 5 in the same general orientation relative to the moving support surface 101A as the sheet 5 is transported downstream on vacuum belt 101.

As the sheet 5 is being transported downstream on the first support surface 101A, the sheet approaches an adhesive applying station 110. The first suction force is sequentially released from each discrete areas of pores 70 (as the sheet moves beyond the downstream boundary of the first vacuum chamber and the first vacuum belt then moves under the first vacuum chamber while the sheet 5 is conveyed through the adhesive applying station 110. At the adhesive applying station, an application roller 114 rotates the application pads 112 with glue thereon against the sheet 5, thereby placing glue spots 7 in the predetermined swatch 8 locations while pressing the sheet 5 against the concave bar 185.

The sheets 5 traverse through the adhesive applying station 110 they are still partly engaged by the first moving belt and are partly engaged by the pull of a vacuum of the second vacuum belt 103 which pulls the sheet through the adhesive applying station. The second suction force being pulled through the second vacuum belt acts through discrete areas of pores 70 of the second moving support surface 103A of that belt as the belt moves over the upstream boundary of the second vacuum chamber 107 under the second vacuum belt and pulls on the sheet 5 as the leading edge 6 of the sheet 5 emerges from the adhesive applying station 110 and while the remaining portion of sheet 5 is still being held onto the first moving support surface 101A by the first suction force of the first endless vacuum conveyor belt 101. In the illustrated form of the invention, the second vacuum chamber 107 is secured under the second endless vacuum belt conveyor 103. The second suction force acts through discrete areas of pores 70 in the second moving support surface 103A to pull the sheets 5 thereon. Again, in one illustrated embodiment, the discrete areas of pores are arranged in rows of eight that are transverse to the downstream direction.

As the second vacuum belt 103 continues transporting the leading edge 6 of the sheet 5 in the downstream direction, each successive row of discreet pore areas sequentially pull and hold the remaining portion of the sheet 5 onto the second moving the second moving endless conveyor belt. This sequential pulling and holding of the sheet 5, combined with the sequential releasing of the first suction force, keeps the sheet in substantially continuous engagement with the first and second endless vacuum belts 101 and 103 thereby ensuring that the sheet 5 maintains the same general orientation relative to the moving support surfaces 101A and 103A.

Next, as the sheet 5, with glue thereon, approaches an another operating station 160, which is a swatch applying station 120, the substantially same process as described above is repeated with respect to the holding releasing and pulling to transport sheet 5. As the sheet 5 approaches the swatch applying station 120, the suction force acting through the second moving vacuum belt 103 is sequentially released from each discreet areas of pores 70 as the sheet passes the downstream boundary of the second vacuum chamber 107 under the second vacuum belt and each row of pores 70 then moves under the second endless vacuum belt conveyor while the sheet 5 is conveyed through the swatch applying station 120 and is engaged by a third vacuum belt as the leading edge of sheet 5 passes the upstream boundary of the third vacuum chamber 108 under the third vacuum belt 104.

The sheet 5 moves through the swatch applying station 120 it is still partly engaged by the second moving belt and are partly engaged by the pull of a vacuum of the third vacuum belt 104 which pulls the sheet through a swatch applying station. A third suction force being pulled through the third vacuum belt acts through discrete areas of pores 70 of the third moving support surface 104A of that belt as the belt moves over the upstream boundary of the third vacuum chamber 108 under the third vacuum belt and pulls on the sheet 5 as the leading edge 6 of the sheet 5 emerges from the swatch applying station 120 and while the remaining portion of sheet 5 is still being held onto the second moving support surface 103A by the second suction force of the second endless vacuum conveyor belt 103.

As the third moving vacuum belt 104 continues transporting the leading edge 6 of the sheet 5 in the downstream direction, each successive row of discreet areas of pores in the third moving vacuum belt sequentially pull and hold the remaining portion of the sheet 5 onto the third moving support surface 104A of the third endless conveyor belt. This sequential pulling and holding of the sheet 5, combined with the sequential releasing of the second suction force as the sheet passes the downstream boundary of the second vacuum chamber under the second vacuum belt, keeps the sheet 5 in substantially continuous engagement with the second and third endless vacuum belt conveyors thereby ensuring that the sheet 5 maintains the same general orientation relative to the moving support surfaces 103A and 104A.

Figure 14:
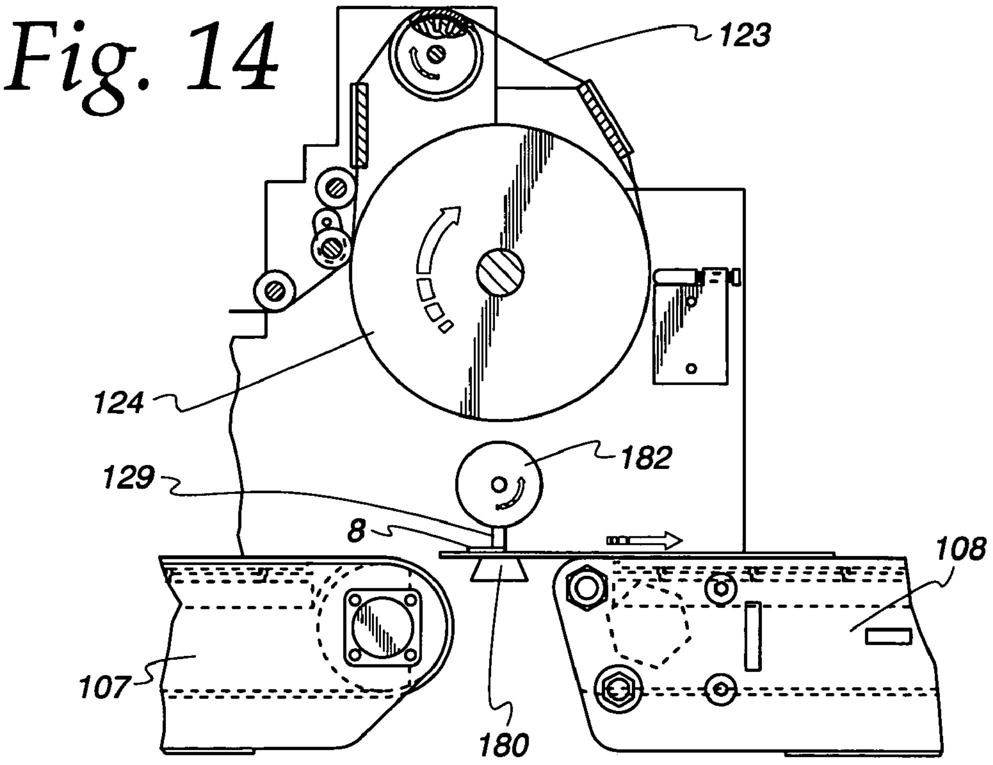
FIG. 14 is an elevational view similar to FIGS. 12-13 showing the rocker bar returned to its raised position and the swatch being applied to the sheet.
Figure 15:
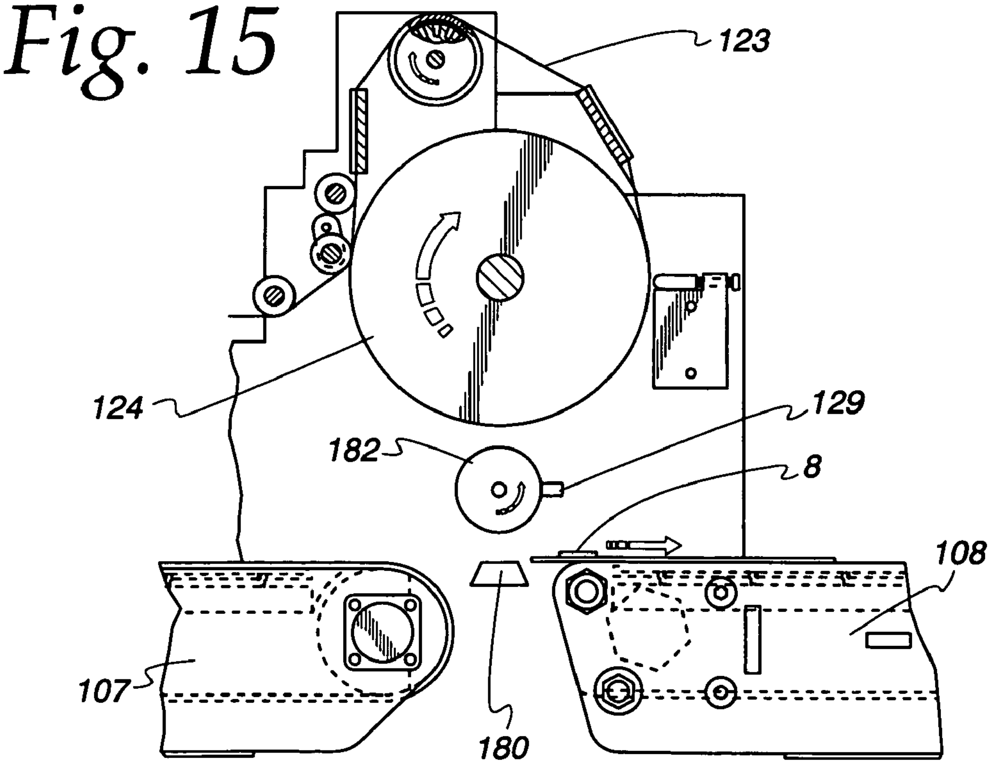
FIG. 15 is an elevational view similar to FIGS. 12-14 showing the rocker bar in its raised position and the swatch applied to the sheet.

As the sheet 5 is pulled through the swatch applying stations 120, ribbon 123 is unwound from rolls 121 of ribbon 123. The ribbon 123 is severed into swatches 8 by the severing blade 125 contacting the severing bar 128. The swatches 8 are held by a vacuum against the suction holes 126 of the swatch roller 124. The vacuum is released from the swatch roller 124, allowing the swatches 8 to adhere to the suction strip 129 of the transfer roller 182. As the sheet 5 passes through the swatch applying station 120, a rocker bar 180 rocks into its lower position coinciding with the swatches 8, adhered by vacuum to the swatch strip 129 on the transfer roller 182, being placed on the glue spots 7 on the sheet 5, as illustrated in FIG. 14. When the swatch 8 is placed on the glue spot 7, the rocker bar 180 rocks back to its upper position and the vacuum is removed from the swatch strip 129, releasing the swatch 8 therefrom, as illustrated in FIG. 15.

To accommodate certain predetermined manufacturing specifications, the sheet 5 also may be transported through additional operating stations 160 subsequent to the swatch applying station 120 whereby the process of holding, releasing, applying, and pulling could again be repeated on vacuum belts 105 and 109. For example, multiple rows of swatches 8 may need be applied to the sheets 5 thereby requiring a plurality of successive swatch applying stations 120 as shown in FIG. 1.

After the vacuum is removed and the rocking bar rocks back into position, the sheet 5 continues to be transported on a fourth moving vacuum belt 105 in the downstream direction. As the sheet continues advancing, it is transported to a pressing station 140 on a fifth moving vacuum belt 109. At the pressing station 140, the sheet 5 is pressed and fed forward by the nips formed between sets of pressing rollers 141, each set comprising a pressing roller 141 below the sheet 5 and a pressing roller 141 above the sheet 5. The pressing rollers 141 press the swatches 8 firmly onto the glue spots 7 on the sheet 5. The sheet is advanced through the pressing rollers by the rotation of the pressing rollers 141 and the sheet then proceeds to an inspection station 145 on a sixth vacuum belt 111 and any subsequent processing stations (not shown). The pressing rollers differ from the upstream work stations in that a nip or nips hold the sheets passing through the nip(s) and the pressing station such that at some points in time the sheets in the pressing station are not engaged by the vacuum belts, but rather the nip(s).

Figure 17A:
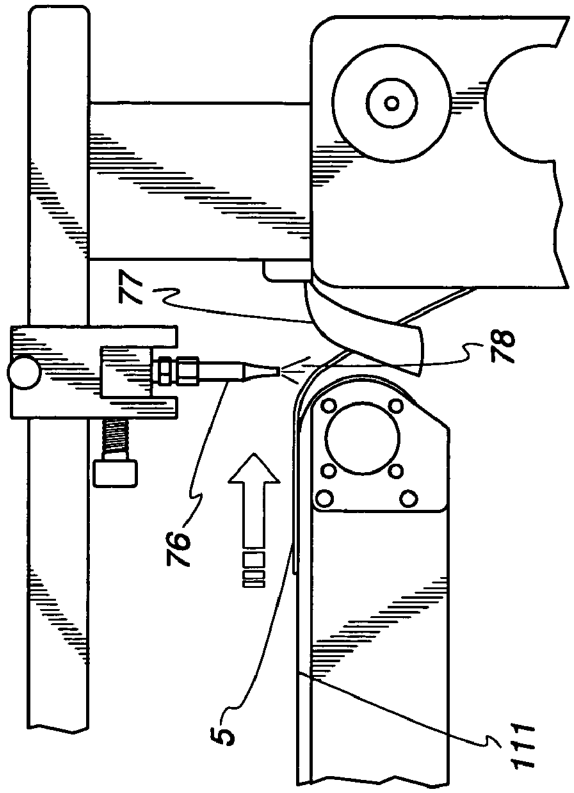
FIG. 17 and FIG. 17A illustrate the operation of a sheet reject station.
Figure 17:
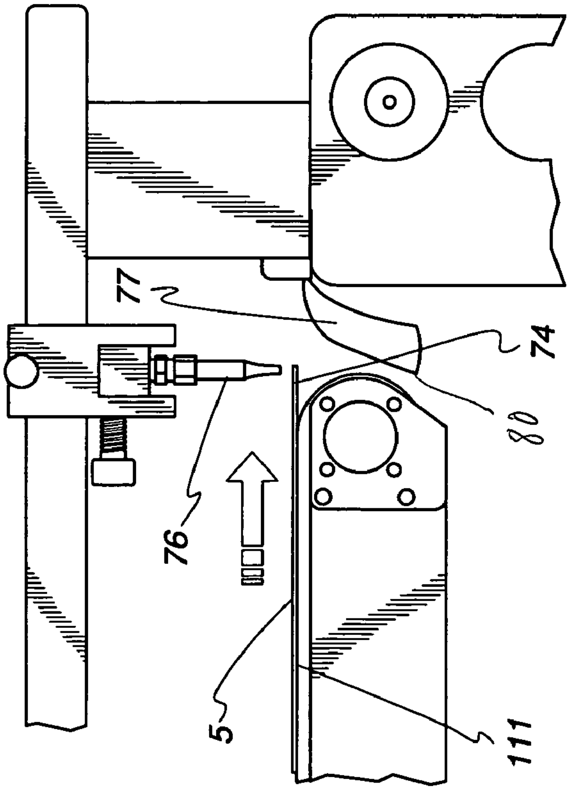

In the embodiment depicted, after the sheet 5 is pressed at the pressing station 140, the sheet is further advanced along a sixth endless vacuum conveyor 111 to an inspection station 145) wherein the sheet 5 is examined by an electronic inspection device (145) to determine whether the position and registration of the swatches 8 are acceptable. If the inspection station determines the position and/or registration is acceptable, the sheet is transported further along the sixth endless vacuum conveyor belt 111 to be rolled off the conveyor. If a determination of unacceptability is made, jets of air divert the sheet 5 into an area for rejected sheets. As seen in FIGS. 17 and 17A and as with the work stations, the vacuum belt 111 proceeds beyond the vacuum chamber downstream the inspection station as seen at 74, the vacuum on the sheets 5 is broken. If the inspection station determines there is something wrong with an inspected sheet, the air jet nozzles 76 are activated to push the rejected sheet downward with a jet of air on the upper surface of the sheet and with the help of deflector 80 into a reject chamber 77 as seen in FIG. 17A.

Figure 18:
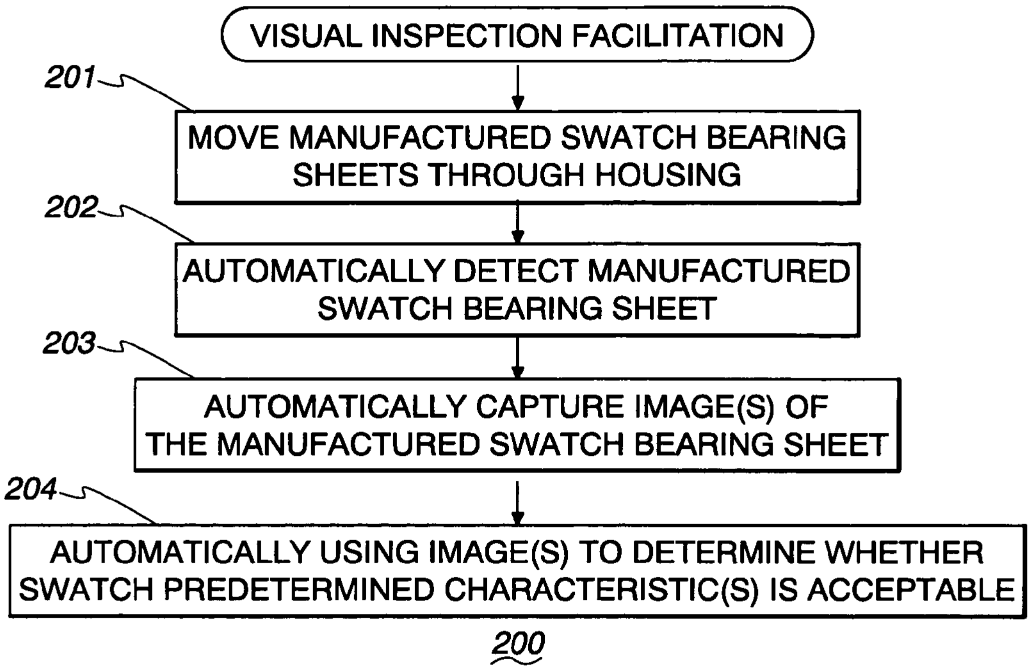
FIG. 18 is a flow diagram for various inspection processes.

A corresponding visual inspection facilitation process 200 appears in FIG. 18. Pursuant to this process 200, one effects movement 201 of a manufactured swatch bearing sheet through a housing from an upstream side input to a downstream side output. In a preferred embodiment the housing comprises a substantially opaque housing (made, for example, of an opaque metal or plastic).

In continued accordance with the teachings set forth herein, this movement may be provided by moving the manufactured swatch bearing sheets using at least one endless vacuum belt having discrete areas of pores through which a vacuum may be pulled to hold the manufactured swatch bearing sheets onto the belt as the belt proceeds towards the downstream side output. So configured, sheets may enter, move through, and exit the housing of the inspection station as is otherwise generally described and set forth herein. In a preferred embodiment, these sheets remain in substantially continuous movement while traversing the housing. So configured, movement of the sheets through the inspection station remains substantially synchronous with movement of the sheets through other portions of the manufacturing line.

If desired, the inspection station may further comprise one or more illumination sources to illuminate the sheets as they move through the housing. These illumination sources may comprise white light or may comprise a variant (such as so-called black light) as may be appropriate or desired to meet the particular needs of a given application.

This visual inspection facilitation process 200 also provides for the automatic detection 202 of a manufactured swatch bearing sheet that is located within the housing. In a preferred approach this comprises detecting not only the general presence of such a sheet within the housing but also the specific presence of the sheet at a specific location within the housing. As will be described below in more detail, this can comprise automatically detecting an edge of the sheet at a specific location within the housing.

Figure 19:
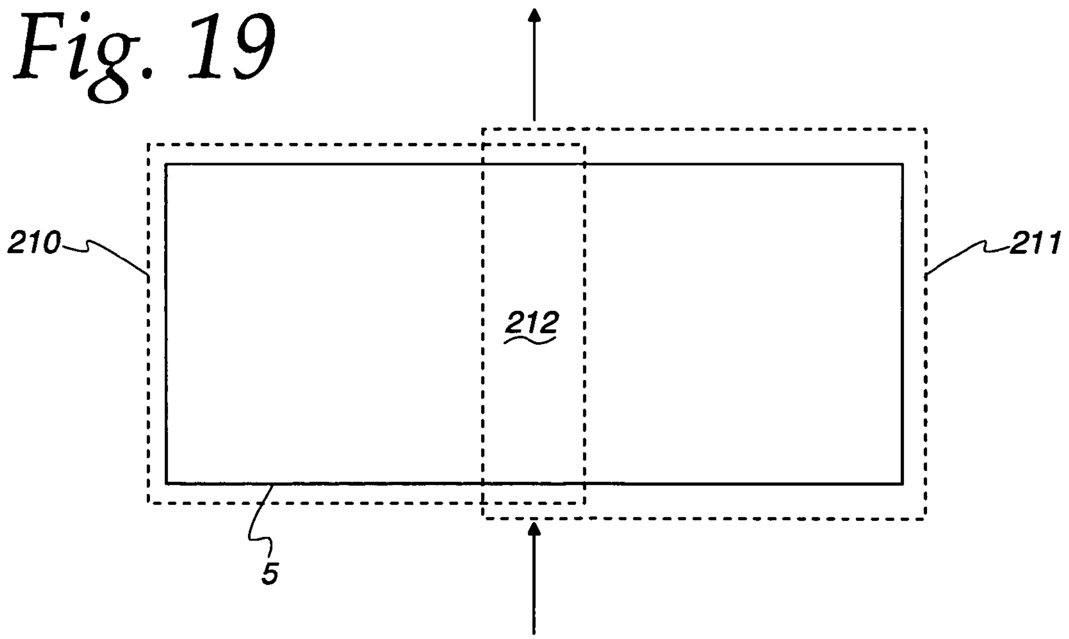
FIG. 19 is a top plan schematic view as corresponds to two captured image fields for a swatch bearing sheet.

In response to detecting the manufactured swatch bearing sheet within the housing, and while the sheet is moving through the housing as described above, this process then next automatically captures 203 at least one image of at least a portion of the manufactured swatch bearing sheet. This may optionally (but preferably) comprise automatically capturing multiple images of overlapping portions of the manufactured swatch bearing sheet. To illustrate, and referring momentarily to FIG. 19, a first image 210 of a first portion of a given sheet 5 may be captured as well as a second image 211 of a second portion of the sheet 5 as the sheet moves through the housing (represented by the arrows in FIG. 19). These two images 210 and 211 are shown to overlap one another, thereby giving rise to a corresponding overlap area 212. The size of this overlap area may of course vary with the needs and/or requirements of a given application setting. In general, at least one purpose for causing such an overlap is to ensure that no relevant portion of a sheet goes uncaptured.

Referring again to FIG. 18, this process then optionally (but preferably) provides for automatically using 204 the captured image (or images) to determine whether at least one predetermined characteristic as pertains to at least one swatch as appears on the manufactured swatch bearing sheet is acceptable. Examples of possibly useful predetermined characteristics include, but are not limited to, the presence or absence of a swatch, the orientation of a swatch, the occlusion of text or other graphics or printed content by a swatch, and so forth, to name but a few.

So configured it is possible to inspect each and every swatch of each and every sheet as may be manufactured by a given line as is otherwise described herein. Those skilled in the art will further appreciate that such an inspection process permits substantive inspection at a rate that is able to keep pace with the rapid cycle time capabilities of the other teachings that are set forth herein.

Figure 20:
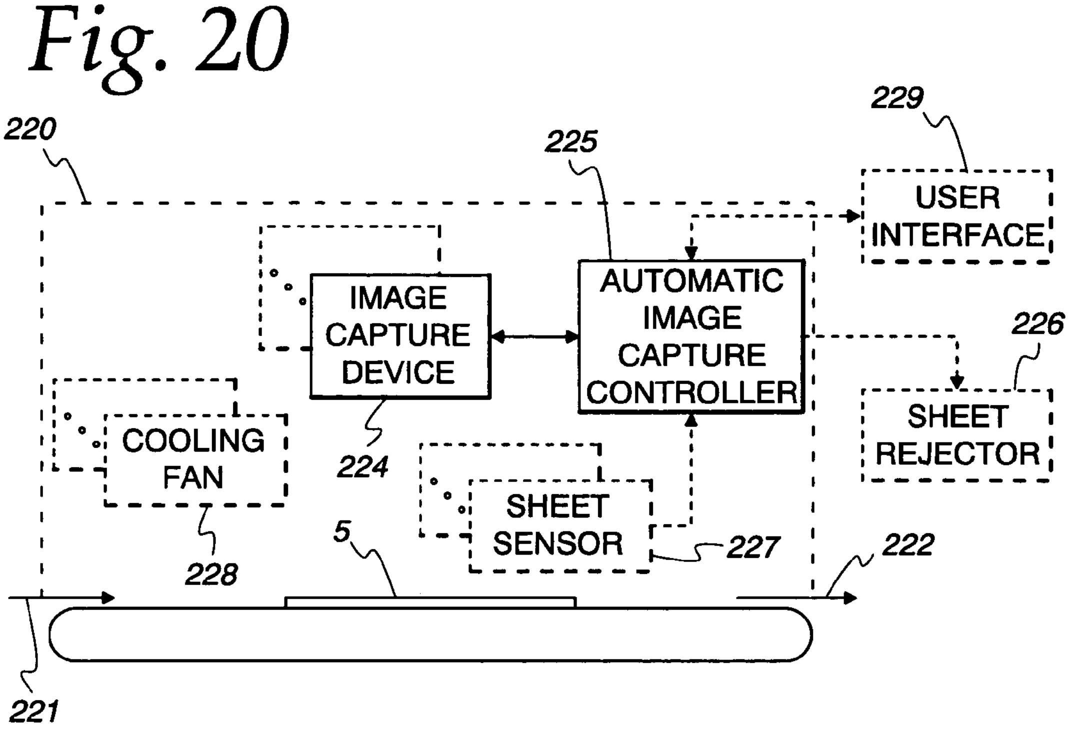
FIG. 20 is a block diagram view corresponding to an inspection station.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 20, an illustrative approach to such an inspection station will now be provided.

The depicted embodiment of an inspection station 145 comprises a housing 220 having an upstream side input 221 and a downstream side output 222. So configured, a swatch bearing sheet 5 can readily enter, pass through, and exit the housing 220. In a preferred approach the housing 220 is comprised, largely or wholly, of substantially opaque material or coatings. If desired, the housing 220 can further feature an access door or window (not shown) to permit inspection, maintenance, or the like.

The housing 220 is preferably disposed in close proximity to a swatch bearing sheet support surface 223 that serves to substantially constantly move swatch bearing sheets 5 from the upstream side input to the downstream side output. As already suggested above, this support surface 223 may preferably comprise at least one endless vacuum belt having discrete areas of pores through which a vacuum may be pulled to hold the swatch bearing sheets onto the belt as the belt proceeds towards the downstream side output. In addition to securely and reliably holding the sheets in a predictable orientation, this approach also retains the sheets in a substantially flat presentation that aids in allowing the input and output access areas to remain relatively low profile. This, in turn, can aid in preventing or at least reducing ambient light from unduly striking the surface of the sheet 5 and thereby possibly interfering with the above-mentioned image capture process.

This inspection station 145 further preferably comprises at least one image capture device 224 (and preferably two or more such devices). Such a device (or devices) is preferably disposed to permit capture of an image of at least a desired portion of a swatch bearing sheet 5 as the swatch bearing sheet 5 moves from the upstream side input 221 to the downstream side output 222. Various image capture platforms and devices are known in the art and may be readily employed for these purposes. In general, it will likely be preferred to use a relatively high resolution color digital camera that is capable of capturing fresh images on a relatively rapid basis (such as, for example, eight times per second). As noted above, in a preferred approach, multiple image capture devices are used and they are disposed such that each captures overlapping images of the sheets 5 moving through the housing 220. Such images may be captured serially for a given sheet but are preferably captured in parallel with one another.

Figure 21:
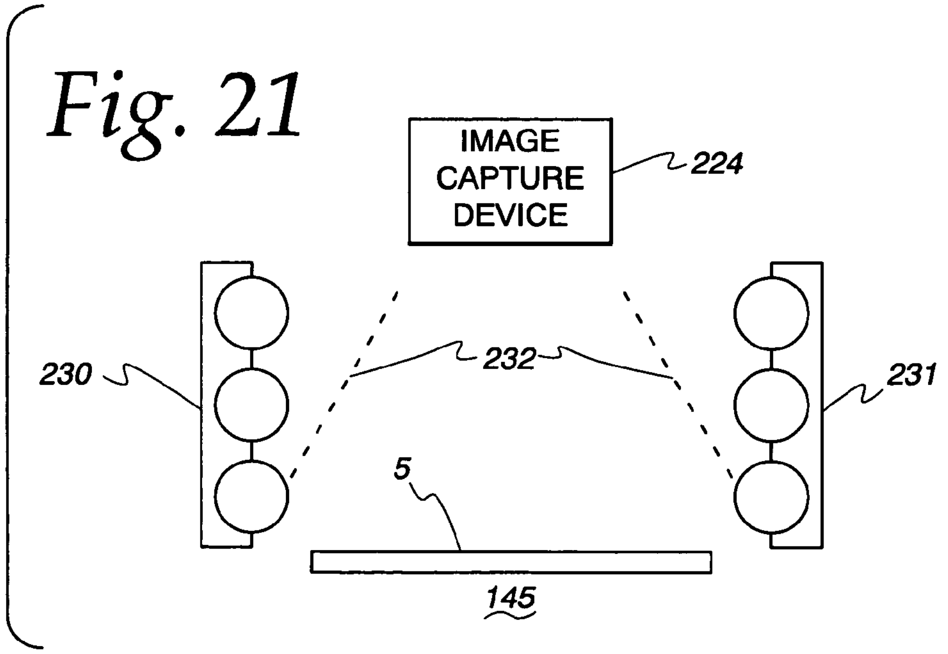
FIG. 21 is a block diagram detail view corresponding to an inspection station.

With momentary reference to FIG. 21, it may be desirable to provide at least one light source within the housing to illuminate the swatch bearing sheets 5 in a predictable and known manner. In a preferred approach this light source will comprise a substantially constantly-on light source such as, but not limited to, an AC high frequency fluorescent light source (i.e., a 40 to 55 KHz fluorescent light source as are known in the art) and/or a direct current (DC) fluorescent light source depending upon the particular application. Pursuant to one approach, and as depicted, a plurality of such light sources 230 and 231 can be disposed on either side of the sheet 5 to be imaged such that the light sources do not block the relevant field of view while also providing adequate lighting of the sheet 5. Depending upon the needs of the application and/or the desires of the operator such light sources can be substantially vertically oriented as shown or can, if desired, by disposed at some other angle as suggested by the phantom lines denoted by reference numeral 232. When using such light sources, it may also be desirable to coat part or all of the interior surface of the housing with a reflective coating of choice. It is important that the light source will properly illuminate the swatch bearing sheet and not interfere with the image capturing device(s).

Referring back to FIG. 20, the inspection station 145 will also preferably comprise an automatic image capture controller 204 that operably couples to the image capture device(s) 224 to control the operation thereof and to receive the images as such images are captured. This automatic image capture controller 204 can comprise a separate element as is suggested by the illustration or can, if desired, comprise functionality that shares an enabling platform with another element such as, but not limited to, the image capture device(s) itself. Such a configuration may be particularly useful when the image capture device 224 has sufficient resident programmable capability to support such additional functionality.

In this embodiment the automatic image capture controller 225 operably couples to a sheet rejector 226 as has been otherwise described above. So configured, when the captured image(s) of a given sheet support a conclusion that the swatch placement process has somehow gone awry for that particular sheet, the sheet rejector 226 can automatically respond by removing the identified sheet from the general flow of the process and thereby remove such a sheet from the acceptable yield output of that process.

This inspection process tends to rely upon being able to accurately compare a captured image with corresponding evaluation criteria. In general, this process will benefit from accurately knowing the position of the sheet being imaged at the time of being imaged. To facilitate the availability of such information, this embodiment optionally but preferably makes use of one or more sheet sensors 227. Such a sheet sensor 227 may comprise, for example, an edge sensor (such as an optical edge sensor as is known in the art) that detects when the leading or trailing edge of a sheet is at a particular predetermined location. So configured, and by operably coupling the sheet sensor(s) 227 to the automatic image capture controller 225, the latter is able to control the operation of the image capture device(s) 224 as a function, at least in part, of the specific location of the sheets 5 as they move through the housing 220.

Other accouterments may be added as desired or appropriate. For example, it may be useful in some settings to provide the housing 220 with one or more cooling fans 228. Such fans 228 may serve to move air within the housing 220 and/or to introduce fresh air or to exhaust contained air within the housing 220. As another example it may be useful in some settings to provide a user interface that operably couples to, for example, the automatic image capture controller. Various user interfaces are known in the art and these teachings are not particularly sensitive to the selection or use of any particular platform though in general it may be useful to at least provide a visual output regarding the settings and or present operational state of the inspection station. Such a user interface 229 may be employed, for example, to facilitate setting operational parameters of the image capture device 224 (such as resolution, zoom, shutter speed, and so forth) and/or the automatic image capture controller 225 itself. From the foregoing, it will be appreciated that the invention provides a method and apparatus for manufacture of swatch bearing sheets. While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

The invention claimed is:

1. A method of manufacturing swatch bearing sheets comprising:

sequentially supplying sheets to a first endless vacuum belt conveyor with a sheet feeder;

pulling the sheets onto the first endless vacuum belt conveyor with a first suction force, the first suction force pulling through discrete areas of pores in the first endless vacuum belt conveyor from downstream to upstream;

holding the sheets on the first endless vacuum belt conveyor with the first suction force as the sheets are transported in a downstream direction on the first endless vacuum belt conveyor;

sequentially releasing the first suction force of the first endless vacuum belt conveyor as the sheets approach an adhesive applying station, the vacuum being released sequentially through the pores from the downstream to the upstream direction;

applying an adhesive to the sheets at the adhesive applying station;

pulling the sheets onto the second endless vacuum belt conveyor with a second suction force pulling through discreet areas of pores of the second endless vacuum belt conveyor from the downstream to the upstream as the sheets emerge from the adhesive applying station, the second suction force engaging the sheets as the first suction force is being sequentially released and as the sheets are proceeding through the adhesive applying station;

holding the sheets on the second endless vacuum belt conveyor with the second suction force as the sheets are transported in the downstream direction on the second endless vacuum belt conveyor;

sequentially releasing the second suction force pulling through discrete areas of pores of the second endless vacuum conveyor belt as the sheets approach a swatch applying station, the second suction force being released sequentially through the pores from the downstream to the upstream direction;

depositing a swatch onto the sheets at the swatch applying station;

pulling the sheets onto a third endless vacuum belt conveyor with a third suction force pulling through discrete areas of pores of a third endless vacuum belt conveyor from the downstream to the upstream as the sheets emerge from the swatch applying station, the third suction force engaging the sheets as the second suction force is being sequentially released and as the sheets are proceeding through the swatch applying station, the sequential pulling and releasing of the suction forces allowing the sheets to be in substantially continuous engagement with the first and second endless vacuum belt conveyors during the applying of the adhesive and allowing the sheets to be in substantially continuous engagement with the second and third endless vacuum belt conveyors during the depositing of the swatch.

2. The method of claim 1 wherein the first, second and third endless vacuum belt conveyors have top surfaces which run over a first, second and third vacuum chamber each chamber having an upstream boundary and a downstream boundary spaced from the stations such that when the belts and pores therein run over a downstream boundary the suction force is released and when the belts and pores therein run over an upstream boundary the suction force pulls the sheet onto the belts running in the downstream direction.

3. The method of claim 2 wherein the sheet is transported in the downstream direction on the third endless vacuum belt conveyor for further processing which includes transporting the sheets on an endless inspection vacuum conveyor belt conveyor to an inspection station which inspects the sheets which are transported through the inspection station on the endless inspection vacuum belt conveyor.

4. The method of claim 3, wherein the method further comprises: determining whether the sheets are reject sheets during the inspecting of the sheet at the inspection station.

5. The method of claim 4, wherein the method further comprises: diverting the reject sheets with jets of air off of the endless inspection vacuum belt as a vacuum is being released if the inspection station determines the sheet is a reject.

6. A method of manufacturing swatch bearing sheets comprising:

sequentially supplying sheets to a first endless vacuum belt conveyor with a sheet feeder, the first endless vacuum belt including a top porous surface running over a first vacuum chamber, the vacuum chamber having an upstream boundary spaced from the feeder and a downstream boundary spaced from an adhesive applying station;

pulling the sheets onto the first endless vacuum belt conveyor with a first suction force, the first suction force pulling through the porous surface of the first endless vacuum belt conveyor from downstream to upstream as the top porous surface runs over the upstream boundary of the first vacuum chamber;

holding the sheets on the first endless vacuum belt conveyor with the first suction force as the sheets are transported in a downstream direction on the first endless vacuum belt conveyor;

releasing the first suction force of the first endless vacuum belt conveyor as the sheets approach an adhesive applying station, the vacuum being released from the downstream to the upstream direction as the belt crosses the downstream boundary of the first vacuum chamber;

applying an adhesive to the sheets at the adhesive applying station;

pulling the sheets onto the second endless vacuum belt conveyor with a second suction force as the sheets emerge from the adhesive applying station, the second suction force pulling through the porous surface of the second endless vacuum belt conveyor from downstream to upstream as the top porous surface runs over the upstream boundary of the second vacuum chamber, the second suction force engaging the sheets as the first suction force is being sequentially released and as the sheets are proceeding through the adhesive applying station;

holding the sheets on the second endless vacuum belt conveyor with the second suction force as the sheets are transported in the downstream direction on the second endless vacuum belt conveyor;

releasing the second suction force of the second endless vacuum belt conveyor as the sheets approach a swatch applying station, the vacuum being released from the downstream to the upstream direction as the belt crosses the downstream boundary of the second vacuum chamber;

depositing a swatch onto the sheets at the swatch applying station;

pulling the sheets onto a third endless vacuum belt conveyor with a third suction force as the sheets emerge from the swatch applying station, the third suction force pulling through the porous surface of the third endless vacuum belt conveyor from downstream to upstream as the top porous surface runs over the upstream boundary of the third vacuum chamber, the third suction force engaging the sheets as the second suction force is being sequentially released and as the sheets are proceeding through the swatch applying station; and holding the sheets on the third endless vacuum belt conveyor with the third suction force as the sheet is transported in the downstream direction on the third endless vacuum belt conveyor for further processing, the pulling and releasing of the suction forces allowing the sheet to be in substantially continuous engagement with the first and second endless vacuum belt conveyors during the applying of the adhesive and allowing the sheet to be in substantially continuous engagement with the second and third endless vacuum belt conveyors during the applying of the swatch.

7. The method of claim 6 wherein the further processing includes transporting the sheets on an endless inspection vacuum conveyor belt conveyor to an inspection station which inspects the sheets which are transported through the inspection station on the endless inspection vacuum belt conveyor.

8. The method of claim 7, wherein the method further comprises: determining whether the sheets are reject sheets during the inspecting of the sheet at the inspection station.

9. The method of claim 8, wherein the method further comprises: diverting the reject sheets with jets of air off of the endless inspection vacuum belt as a vacuum is being released if the inspection station determines the sheet is a reject.

* * * * *